United States Patent
Omiya

(10) Patent No.: US 8,055,525 B2
(45) Date of Patent: Nov. 8, 2011

(54) METHOD OF FILLING VACANCIES, AND SERVER AND PROGRAM FOR PERFORMING THE SAME

(75) Inventor: Toshiyuki Omiya, Tokyo (JP)

(73) Assignee: P & W Solutions Co., Ltd., Tokyo (JP)

( * ) Notice: Subject to any disclaimer, the term of this patent is extended or adjusted under 35 U.S.C. 154(b) by 607 days.

(21) Appl. No.: 12/093,450

(22) PCT Filed: Nov. 8, 2006

(86) PCT No.: PCT/JP2006/322298
§ 371 (c)(1),
(2), (4) Date: May 12, 2008

(87) PCT Pub. No.: WO2007/055252
PCT Pub. Date: May 18, 2007

(65) Prior Publication Data
US 2009/0164292 A1  Jun. 25, 2009

(30) Foreign Application Priority Data
Nov. 14, 2005  (JP) .................................. 2005-329425

(51) Int. Cl.
*G06Q 10/00* (2006.01)
(52) U.S. Cl. ...................... 705/7.13; 705/7.12; 705/7.16; 705/7.18; 705/7.22
(58) Field of Classification Search .................. 705/7, 8, 705/9, 7.13, 7.16, 7.39
See application file for complete search history.

(56) References Cited

U.S. PATENT DOCUMENTS

| | | | | |
|---|---|---|---|---|
| 5,907,829 A | * | 5/1999 | Kida | ............................ 705/7.16 |
| 6,044,355 A | * | 3/2000 | Crockett et al. | .................... 705/8 |
| 6,587,831 B1 | * | 7/2003 | O'Brien | ............................ 705/8 |
| 6,856,962 B2 | * | 2/2005 | Yonemitsu | .................... 705/7.13 |
| 6,952,732 B2 | * | 10/2005 | Nourbakhsh et al. | .......... 709/226 |
| 2004/0078257 A1 | * | 4/2004 | Schweitzer et al. | .............. 705/9 |
| 2005/0055256 A1 | * | 3/2005 | Scott | .................................. 705/8 |
| 2006/0184405 A1 | * | 8/2006 | Scott et al. | ......................... 705/7 |

FOREIGN PATENT DOCUMENTS

| | | |
|---|---|---|
| JP | 2002-334190 A | 11/2002 |
| JP | 2003-167981 | 6/2003 |

OTHER PUBLICATIONS

"3 Man'en/Seki' kara no Takino WFM Soft Ware Group Wear Kino o Tosaishi Sosasei o Kaizen", Computer Telephony, Kabushiki Kaisha Ric Telecom, Aug. 20, 2001, vol. 8, No. 9, p. 70.

(Continued)

*Primary Examiner* — Romain Jeanty
*Assistant Examiner* — Naima Akida
(74) *Attorney, Agent, or Firm* — Novak Druce + Quigg LLP

(57) ABSTRACT

A schedule management server is provided to precisely fill vacancies. A computer includes a communication network and a terminal device. The computer generates assumed schedule data indicative of schedules assumed for a plurality of staffs and starts receiving desired schedule data indicative of schedules desired by the plurality of staffs from the terminal device connected to the communication network. The computer receives and stores the desired schedules from the terminal device and generates vacancy schedule data indicative of vacancies of the plurality of staffs based on the assumed schedule data and the desired schedule data.

8 Claims, 26 Drawing Sheets

OTHER PUBLICATIONS

"Web Taio Skill Set Settei Call Ryo Yosoku WFM Soft Ware Saishin 11 Seihin no Jitsuryoku", Computer Telephony, Kabushiki Kaisha Ric Telecom, Sep. 20, 2003, vol. 6, No. 10, pp. 80-87.

"Shift Jido Waritsuke Koryo Yosoku nado no Kino o Tosai Chukibo Center o Taisho ni Zokuzoku Tojo suru Kokusan WFM Tool", Computer Telephony, Kabushiki Kaisha Ric Telecom, Jun. 20, 2004, vol. 7, No. 7, pp. 42-46.

"Koryo Yosoku kara Tekisei Jin'in Haichi made o Han Jidoka DHL, JAL ni miru WFM Tool no Kokateki Donyuho", Computer Telephony, Kabushiki Kaisha Ric Telecom, May 20, 2005, vol. 8, No. 6, pp. 48-53.

Japanese Office Action issued on Mar. 22, 2011 in the corresponding Japanese Patent Application No. 2005-329425.

\* cited by examiner

FIG. 5

ASSUMED-SCHEDULE DATA TABLE

| MONTH | 8 | 8 | 8 | ... |
|---|---|---|---|---|
| DAY | 1 | 1 | 1 | ... |
| TIME | 9:00 | 10:00 | 11:00 | ... |
| REQUIRED NUMBER OF STAFF | 26.5 | 33 | 67.5 | ... |

FIG. 8

REQUESTED-SCHEDULE DATA TABLE

| ID | NAME | 1ST CHOICE | 2ND CHOICE |
|---|---|---|---|
| xxxx1234 | ○○HANAKO | 2005.11.5 | 2005.11.12 |
| zzz465 | ○○TARO | 2005.11.3 | 2005.11.5 |
| ⋮ | ⋮ | ⋮ | ⋮ |

FIG. 9

CAMPAIGN: FOR SEMINAR

| PREVIOUS MONTH ▼ | AUGUST 2005 ▲ | NEXT MONTH | | | | |
|---|---|---|---|---|---|---|
| MONDAY | TUESDAY | WEDNESDAY | THURSDAY | FRIDAY | SATURDAY | SUNDAY |
| 1 | 15/42 | 10/40 | 12/37 | 11/38 | 11/10 | 6/10 |
| 8 | 14/15 | 9 | 10 | 12 | 13 | 14 |
| 18/20 | 14/15 | 12/34 | 12/8 | 11/38 | 0/8 | 9/13 |
| 15 | 10/30 | 16 | 17 | 18 | 19 | 20 |
| 22 | 10/30 | 15/26 | 11/27 | 13/13 | 10/15 | 21 |
| 14/15 | 11/23 | 15/10 | 12/8 | 26 | 7/27 | |
| 9/17 | 29 | 30 | 31 | | | |
| | 17/23 | 10/29 | | | | |

NUMBER OF APPLICANTS: 2
NUMBER OF STAFF WHO CAN TAKE WEEKLY HOLIDAY: 5/4

HOLIDAY CALENDAR
☐ DAYS ON WHICH WEEKLY HOLIDAY IS NOT PERMITTED
▨ DAYS ON WHICH WEEKLY HOLIDAY CAN BE TAKEN (DETAILED SET-UP)

AUGUST 20, 2005   NUMBER OF APPLICANTS: 10 / NUMBER OF STAFF WHO CAN TAKE WEEKLY HOLIDAY: 15

| SELECTION | ORDER OF CHOICE | NAME | DEPARTMENT NAME | SKILLS POSSESSED |
|---|---|---|---|---|
| ☑ | 1ST CHOICE | OOHANAKO | SUPPORT D | SERVER SKILL, ENGLISH SKILL |
| ☑ | 1ST CHOICE | OOTARO | SUPPORT D | — |
| ☑ | 1ST CHOICE | OOMITSUKO | SUPPORT D | CHINESE SKILL |
| ☑ | 1ST CHOICE | OOSHIRO | SUPPORT D | — |
| ☑ | 1ST CHOICE | OOGORO | SUPPORT D | FRENCH SKILL |

(EXECUTE AUTOMATIC ALLOCATION)

FIG. 11

INTERIM-SCHEDULE DATA TABLE

| MONTH | 8 | 8 | 8 | ... |
|---|---|---|---|---|
| DAY | 1 | 1 | 1 | ... |
| TIME | 9:00 | 10:00 | 11:00 | ... |
| REQUIRED NUMBER OF OPERATORS | 26.5 | 33 | 67.5 | ... |
| NUMBER OF ALLOCATED OPERATORS | 19.75 | 22.75 | 60 | ... |
| NUMBER OF ALLOCATED OPERATORS * EFFICIENCY RATIO | 19.75 | 22.75 | 58.3 | ... |
| NUMBER OF EXCESS OR DEFICIENT OPERATORS AND EFFICIENCY RATIO | -6.75 | -10.3 | -9.2 | ... |

FIG. 14

REQUIRED SKILL DATA

| SCHEDULE | REQUIRED SKILL |
|---|---|
| A | SERVER SKILL/ENGLISH SKILL |
| B | — |
| C | CHINESE SKILL |

FIG. 15

TO-BE-RECRUITED OPERATORS
SEARCH RESULT    64 INTENDED-RECRUITED OPERATORS

| SELECTION | DEPARTMENT | NAME | ID | EMPLOYMENT TYPE | SKILL POSSESSED |
|---|---|---|---|---|---|
| ☐ | SUPPORT D | OOHANAKO | xxxx1234 | PART-TIME EMPLOYEE | SERVER SKILL/ENGLISH SKILL |
| ☐ | SUPPORT D | OOTARO | zzz465 | FULL-TIME EMPLOYEE | — |
| ☐ | SUPPORT D | OOMITSUKO | yyyy789 | FULL-TIME EMPLOYEE | CHINESE SKILL |
| ☐ | SUPPORT D | OOSHIRO | aaa321 | PART-TIME EMPLOYEE | — |
| ☐ | SUPPORT D | OOGORO | cccc6543 | FULL-TIME EMPLOYEE | FRENCH SKILL |
| ☐ | SUPPORT D | OODAIGORO | bbbb555 | PART-TIME EMPLOYEE | SERVER SKILL |
| ☐ | SUPPORT D | OOICHIKO | eeee9638 | FULL-TIME EMPLOYEE | — |
| ☐ | SUPPORT D | OOSANTA | wwww12 | FULL-TIME EMPLOYEE | ENGLISH SKILL |
| ☐ | SUPPORT D | OOYOTSUMI | qqqq741 | PART-TIME EMPLOYEE | — |
| ☐ | SUPPORT D | OOJIRO | kkk987 | FULL-TIME EMPLOYEE | APPLICATION SOFTWARE SKILL |
| ☐ | SUPPORT D | OOJIRO | ttttt6666 | PART-TIME EMPLOYEE | — |
| ☐ | SUPPORT D | OOYOTSUKO | pppp888 | FULL-TIME EMPLOYEE | — |

FIG. 16

| PERSONAL SET-UP | | |
|---|---|---|
| NAME ○○HANAKO | LOGIN ID hanako | ACCOUNT LOCK ☐ |
| HOW TO PRONOUNCE NAME ○○○HANAKO | PASSWORD ●●●●●●●● | |

| EMPLOYEE ID | xxxx1234 | | |
|---|---|---|---|
| EMPLOYMENT TYPE | FULL-TIME EMPLOYEE ▽ | | |
| DEPARTMENT | SUPPORT D ▽ | | |
| NEW PASSWORD (INPUT ONLY FOR UPDATING) | | NEW PASSWORD (FOR CONFIRMATION) | |
| NUMBER OF OUTSIDE LINE | | EXTENSION NUMBER | |
| ADDRESS | CITY/TOWN/VILLAGE/COUNTY TOKYO METROPOLITAN CITY ▽ | SHINAGAWA WARD | STREET NUMBER ※ HIGASHI-SHINAGAWA○-○-○ |
| APARTMENT, ETC. ※ | | | |
| HOME PHONE ※ | 0312345678 | | |
| MOBILE PHONE ※ | 09012345678 | | |
| E-MAIL (BUSINESS) | xxxxx@yy.com | | |
| E-MAIL (PRIVATE) ※ | xxxxxxx@ppp.com | | |
| MOBILE E-MAIL ※ | xxx@dddd.ne.jp | | |
| DISCLOSE/HIDE | ☐ ※CLICK HERE TO HIDE | | |
| RECRUITMENT CONTACT | ☑ BULLETIN BOARD | | |
| | ☑ MAIL ⦿ E-MAIL (BUSINESS) ○ E-MAIL (PRIVATE) ○ MOBILE E-MAIL | | |

↻ [UPDATE]

△:○○TARO

STAFF RECRUITMENT

| PROJECT NAME | SEMINAR 1 | | |
|---|---|---|---|
| WORKING DAY | 2005/8/1 | NUMBER OF STAFF TO BE RECRUITED | 10 |
| WORKING HOURS | 9:00-18:00 | | |
| APPLICATION STATUS | NOT YET | | |
| DETAIL | LUNCH 30 MINUTES 11:30-12:00, BREAK 15 MINUTES 13:45-14:00 | | |
| COMMENT | WE ARE IN SHORT OF STAFF ESPECIALLY FOR AFTERNOON. PLEASE APPLY. | | |

[ CONFIRMED ]  [ APPLY ]

VIEWING DATA TABLE

| DEPARTMENT | NAME | ID | CONFIRMED | EMPLOYMENT TYPE | SKILLS POSSESSED |
|---|---|---|---|---|---|
| SUPPORT D | OOHANAKO | xxxx1234 | 1 | PART-TIME EMPLOYEE | SERVER SKILL/ENGLISH SKILL |
| SUPPORT D | OOTARO | zzz465 | 0 | FULL-TIME EMPLOYEE | — |
| SUPPORT D | OOMITSUKO | yyyy789 | 1 | FULL-TIME EMPLOYEE | CHINESE SKILL |
| SUPPORT D | OOSHIRO | aaa321 | 0 | PART-TIME EMPLOYEE | — |
| SUPPORT D | OOGORO | cccc6543 | 0 | FULL-TIME EMPLOYEE | FRENCH SKILL |
| SUPPORT D | OODAIGORO | bbbb555 | 0 | PART-TIME EMPLOYEE | SERVER SKILL/ENGLISH SKILL |
| SUPPORT D | OOCHIKO | eeee9638 | 1 | FULL-TIME EMPLOYEE | — |
| SUPPORT D | OOSANTA | wwwww12 | 1 | FULL-TIME EMPLOYEE | ENGLISH SKILL |
| SUPPORT D | OOYOTSUMI | qqqq741 | 0 | PART-TIME EMPLOYEE | — |
| SUPPORT D | OOJIRO | kkk987 | 1 | FULL-TIME EMPLOYEE | APPLICATION SOFTWARE SKILL |
| SUPPORT D | OOJIRO | ttttt6666 | 0 | PART-TIME EMPLOYEE | — |
| SUPPORT D | OOYOTSUKO | pppp888 | 0 | FULL-TIME EMPLOYEE | — |

EMPLOYMENT DATA TABLE

| ID | NAME | APPLICATION DATE | SKILL | EVALUATION | EMPLOYMENT TYPE |
|---|---|---|---|---|---|
| xxxx1234 | ○○HANAKO | AUGUST 5, 2005 | SERVER SKILL/ ENGLISH SKILL | A | FULL-TIME EMPLOYEE |
| zzz465 | ○○TARO | AUGUST 5, 2005 | — | C | FULL-TIME EMPLOYEE |
| yyyy789 | ○○MITSUKO | AUGUST 4, 2005 | CHINESE SKILL | B | FULL-TIME EMPLOYEE |
| ⋮ | ⋮ | ⋮ | ⋮ | ⋮ | ⋮ |

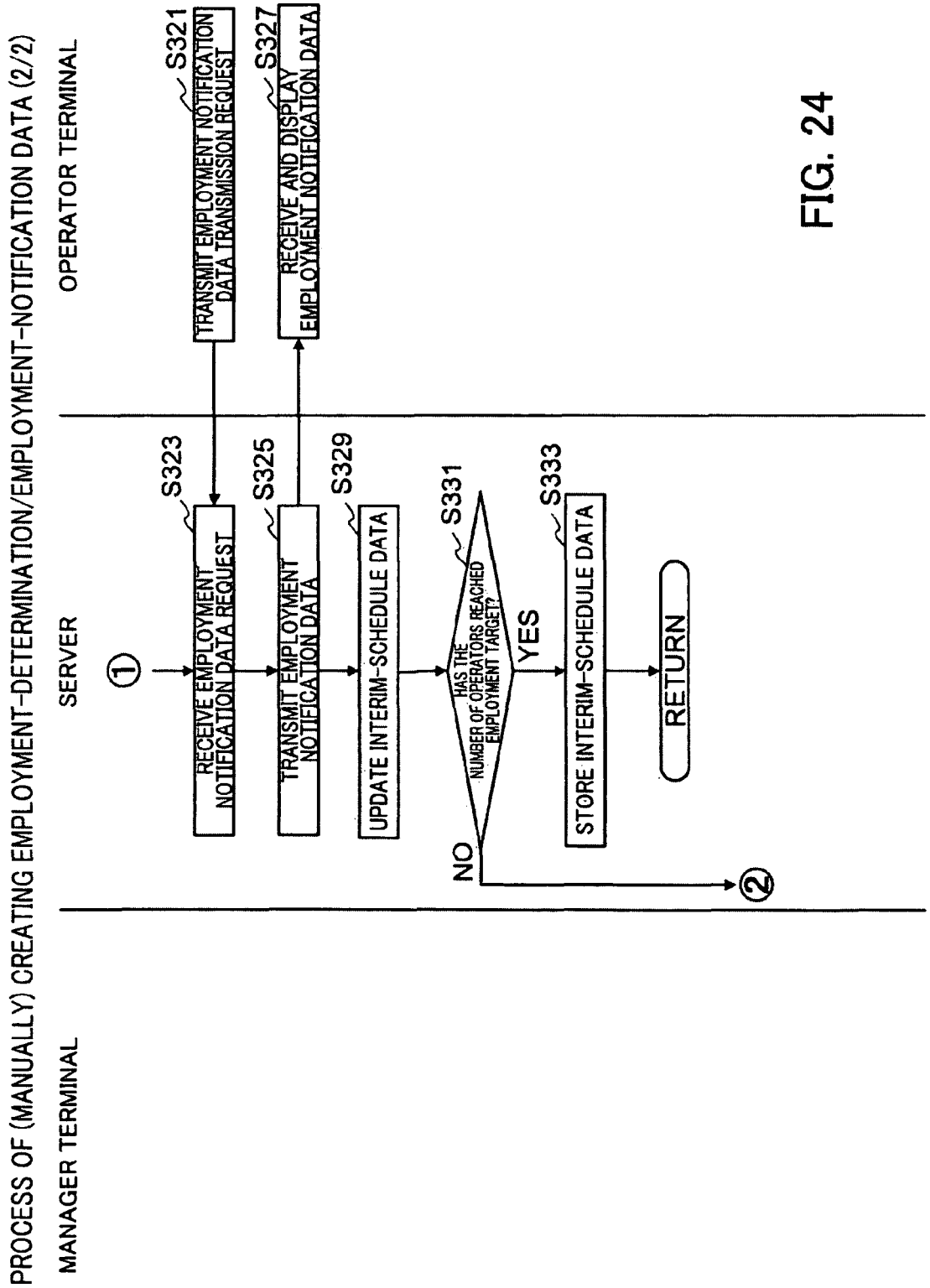

FIG. 25

RECRUITMENT

| | |
|---|---|
| RECRUITMENT PROJECT NAME | URGENT RECRUITMENT! |
| RECRUITMENT TYPE | ○ MAIL  ○ BULLETIN BOARD |
| EMPLOYMENT METHOD | ○ MANUAL  ○ FIRST COME, FIRST SERVE  ● ORDER OF SKILL EVALUATION |
| DEADLINE | 2005 YEAR 11 MONTH 15 DAY 00 TIME |
| CAMPAIGN (TASK) | FOR SEMINAR |
| SHIFT NAME | |
| WORK DAY | 2005 YEAR 11 MONTH 7 DAY |
| WORK HOURS | 18 : 00 - 22 : 00 |
| THE NUMBER OF STAFF TO BE RECRUITED | 7 PERSONS |
| HOURLY PAY | 1800 YEN |
| ☐ USE CONDITIONAL APPLICATION FUNCTION | |

| REQUIRED SKILL | SKILL LEVEL | EFFICIENCY (%) |
|---|---|---|
| CHINESE SKILL | | |
| ENGLISH SKILL | | |
| KOREAN SKILL | | |
| FRENCH SKILL | | |
| VPN | | |
| VoIP | | |

AND FREQUENCY ☐ (1-10); MORE THAN

EMPLOYMENT SELECTION SETUP
- PRIORITY ● SKILL LEVEL TAKES PRIORITY ○ EFFICIENCY TAKES PRIORITY
- SKILL LEVEL ● DESCENDING ORDER ○ ASCENDING ORDER
- EFFICIENCY ● DESCENDING ORDER ○ ASCENDING ORDER

[ INTENDED-RECRUITED STAFF DISPLAY ]

INTENDED-RECRUITED STAFF
SEARCH RESULTS  NUMBER OF INTENDED-RECRUITED STAFF: 64

| BROADCAST SELECTION | DEPARTMENT | NAME | ID | EMPLOYMENT TYPE | SKILLS POSSESSED |
|---|---|---|---|---|---|
| ☐ | SUPPORT D | ○○HANAKO | xxxx1234 | PART-TIME EMPLOYEE | SERVER SKILL/ENGLISH |
| ☐ | SUPPORT D | ○○TARO | zzz465 | FULL-TIME EMPLOYEE | — |
| ☐ | SUPPORT D | ○○MITSUKO | yyyy789 | FULL-TIME EMPLOYEE | CHINESE SKILL |
| ☐ | SUPPORT D | ○○SHIRO | aaa321 | PART-TIME EMPLOYEE | — |
| ☐ | SUPPORT D | ○○GORO | cccc6543 | FULL-TIME EMPLOYEE | FRENCH SKILL |

[ SELECT ALL ]  [ CANCEL SELECT ALL ]

[ MAIL TRANSMISSION ]  [ CANCEL ]

| CAMPAIGN (TASK) LIST | | | | | | | | | | | | | | | | | | |
|---|---|---|---|---|---|---|---|---|---|---|---|---|---|---|---|---|---|---|
| CREATE NEW | ORDINARY WORK DAY | | NON-WORK DAY | | | | DAYS ON WHICH HOLIDAYS ARE NOT PERMITTED | | | | today | | | | | | | AUGUST 2005 |
| CAMPAIGN (TASK) | FIRST WEEK | | | | | | | SECOND WEEK | | | | | | | | | | |
| | 01 | 02 | 03 | 04 | 05 | 06 | 07 | 08 | 09 | 10 | 11 | 12 | 13 | 14 | 15 | 16 | 17 | |
| CUSTOMER SUPPORT 〒 | PROGRESS 1 2 3 4 5 6 7 8 9 10 | | | | | | | | | | | | | | PROGRESS 1 2 3 4 | | | |
| | SCHEDULE HAS BEEN DELIVERED | | | | | | | | | | | | | | | | | |
| | 8 | 8 | 9 | -8 | -2 | 4 | 7 | | | 10 | | | | 8 | | | | |
| FOR SEMINAR 〒 | PROGRESS 1 2 3 4 5 6 7 8 9 10 | | | | | | | PROGRESS 1 2 3 4 5 6 7 8 9 10 | | | | | | | PROGRESS 1 2 3 4 | | | |
| | REQUESTED SHIFT APPROVED | | | | | | | REQUESTED SHIFT APPROVED | | | | | | | | | | |
| | -12 | 4 | 6 | -4 | -2 | 1 | -3 | 9 | 6 | -2 | -5 | -4 | 3 | 8 | -9 | 6 | 9 | ~242<br>~243<br>~244 |
| NEW ADMISSION CAMPAIGN 〒 | PROGRESS 1 2 3 4 5 6 7 8 9 10 | | | | | | | | | | | | | | | | | |
| | SCHEDULE HAS BEEN DELIVERED | | | | | | | | | | | | | | | | | |
| | 4 | -1 | 6 | 3 | -8 | -2 | 5 | | | | | | | | | | | |
| ACCOUNT INQUIRY SUPPORT 〒 | | | | | | | | | | | | | | | PROGRESS 1 2 3 4 | | | |
| | | | | | | | | | | | | | | | 4 | 7 | 2 | |

〒 : NUMBER OF EXCESS OR DEFICIENT STAFF IN SCHEDULE

CAMPAIGN LIST
- SweetCampaign
- CUSTOMER SUPPORT
- FOR SEMINAR
- NEW ADMISSION CAMPAIGN
- ACCOUNT INQUIRY SUPPORT

METHOD OF FILLING VACANCIES, AND SERVER AND PROGRAM FOR PERFORMING THE SAME

CROSS REFERENCE TO RELATED APPLICATIONS

This application is a U.S. national phase application based on International Application No. PCT/JP2006/322298 entitled, "Method of Filling Vacancies, and Server and Program for Performing the Same," filed on Nov. 8, 2006, which was not published in English, which is based on and claims the benefit of priority under 35 U.S.C. §119 from Japanese Patent Application No. 2005-329425, filed on Nov. 14, 2005.

TECHNICAL FIELD

The present invention relates to a method of filling staff vacancies, and to a computer and a program for implementing the method. Particularly, the present invention relates to a method of filling staff vacancies in a work schedule, and to a computer and a program for implementing the method.

BACKGROUND ART

Conventionally, various methods have been proposed as methods of managing a duty schedule of employees. For example, Japanese Unexamined Patent Application, First Publication No. 2003-167981, discloses a schedule management system, in which a requested-schedule data for operators at a call center is collected via a network, and schedule data for a predetermined period is created on the basis of the requested-schedule data collected.

The schedule management system receives the requested-schedule data from each of the intended-recruited operators via a network, predicts the number of the intended-recruited operators required in a predetermined period, and compares both data, whereby a schedule is established.

According to such a system, each of the intended-recruited operators transmits their own requested schedule via a network, and in cases where the number of the transmitted requests properly agrees with the predicted number of the required intended-recruited operators, it is possible to establish a duty schedule reflecting the requests. In a case where vacancies occur, the manager in charge of the duty schedule will newly recruit operators with respect to the vacancies.

DISCLOSURE OF THE INVENTION

Problems to be Solved by the Invention

However, in such a system, the manager in charge of the work schedule is not able to precisely know, at the time of recruitment, what kind of skills vacancies of operators would occur. As a result, the manager is not able to accurately carry out the recruitment of operators corresponding to the vacancies after establishing the duty schedule reflecting the requests.

Means for Solving the Problems

In order to solve the aforementioned problem, it is an object of the present invention to provide a schedule management computer which makes it possible to accurately fill the staff vacancies. Specifically, the following are provided.

In a first aspect of a method for a computer (such as a server 1 and a manager terminal 2 to be described later) connected to a communications network (such as an internal communications network 3 and an external communications network 5 to be described later) to manage a work schedule of a plurality of staff of the present invention, the method includes: an assumed-schedule data generation step (such as Step S20 to be described later) for the computer to generate assumed-schedule data that represents an assumed schedule of the plurality of staff; a requested-schedule data acceptance initiation step (such as Steps S61 and S62 to be described later) for the computer to designate a predetermined period and to initiate acceptance of requested-schedule data that represents a requested-schedule of the plurality of staff from a terminal connected to the communications network; a requested-schedule data reception step (such as Step S69 to be described later) for the computer to receive and store the requested-schedule data of the plurality of staff from the terminal; and a vacancy schedule data generation step for the computer to generate and display (such as FIG. 13 to be described later) vacancy schedule data (such as an interim-schedule data table to be described later in FIG. 12) that represents a vacancy schedule of the plurality of staff on the basis of the assumed-schedule data and the requested-schedule data after the designated predetermined period has passed.

According to the first aspect of the present invention, the computer generates assumed-schedule data that represents an assumed schedule of a plurality of staff, initiates acceptance of requested-schedule data that represents a requested schedule of the plurality of staff from a terminal connected to a communications network, receives and stores the requested-schedule data of the plurality of staff from the terminal, and generates and displays vacancy schedule data that represents a vacancy schedule of the plurality of staff on the basis of the assumed-schedule data and the requested-schedule data.

This makes it possible for the manager to consider a recruitment plan by referring to the displayed vacancy schedule.

In a second aspect of the method according to the first aspect of the present invention, the method further includes a recruitment contact data generation step (such as Step S115 to be described later) for the computer to generate recruitment contact data (such as a recruitment contact data to be described later) that represents staff for whom a recruitment contact is performed on the basis of the vacancy schedule data and staff attribute data (such as operator skill data to be described later) that represents staff attributes of the plurality of staff.

According to the second aspect of the present invention, the computer generates recruitment contact data that represents staff for whom a recruitment contact is performed on the basis of the vacancy schedule data and the staff attribute data that represents staff attributes of the plurality of staff.

This makes it possible for the manager to perform the recruitment contact on the basis of the recruitment contact data.

In a third aspect of the method as according to the second aspect of the present invention, the method further includes a recruitment contact data transmission enabling step for enabling the computer to transmit the recruitment contact data only to disclosed contact addresses of the staff via the communications network.

According to the third aspect of the present invention, the computer makes it possible to transmit the recruitment contact data only to disclosed contact addresses of the staff via the communications network.

Therefore, the recruitment contact data is not transmitted to the contact addresses closed by the staff, thereby enabling the prevention of the recruitment contact data from being transmitted to the contact addresses which are desired to be hidden by the staff. As a result, the staff (intended-recruited operators) registered at a call center and the like are able to get the recruitment contact without the personal information being accessed, in which the staff disclose the personal information but do not desire to disclose the personal information to the manager. In this way, there is a possibility to implement a quick recruitment process, while considering the privacy of the staff (intended-recruited operators).

In a fourth aspect of the method according to the second or third aspect of the present invention, the method further includes an application data storing step (such as Step S207 to be described later) for the computer to store application data (such as application data to be described later) in response to the fact that the application data has been received (such as Step S127 to be described later) from the staff (intended-recruited operator) for whom the recruitment contact has been performed via the communications network.

According to the fourth aspect of the present invention, the computer stores application data in response to the fact that the application data has been received from the staff for whom the recruitment contact has been performed via the communications network.

This makes it possible for the computer to automatically accept and accumulate the application data from the staff who have applied.

In a fifth aspect of the method according to the fourth aspect of the present invention, the method further includes an employment data generation step (such as Step S207 to be described later) for the computer to generate employment data (such as employment data to be described later) that represents staff to be employed in response to the fact that the application data has been received from the staff for whom the recruitment contact has been performed via the communications network.

According to the fifth aspect of the present invention, the computer generates employment data that represents staff to be employed in response to the fact that the application data has been received from the staff for whom the recruitment contact has been performed via the communications network.

This makes it possible to automatically determine the staff to be employed in response to the reception of the application data.

In a sixth aspect of the method according to the fourth aspect of the present invention, the method further includes a viewing confirmation data storing step for the computer to store viewing confirmation data (such as Step S119 to be described later) in response to the fact that the viewing confirmation data has been received from the terminal (such as Step S119 to be described later), the viewing confirmation data representing the fact that the terminal has accepted viewing by the staff for whom the recruitment contact has been performed.

According to the sixth aspect of the present invention, the computer stores the viewing confirmation data in response to receiving the viewing confirmation data from the terminal that has received the recruitment contact, the viewing confirmation data indicating that the recruitment contact has been viewed at the terminal.

This enables the computer to automatically accumulate the viewing status of the recruitment contact at the terminals of the staff to whom the recruitment contact has been performed.

In a seventh aspect of the method as described in the sixth aspect of the present invention, the method further includes an application/viewing status display step for the computer to display the stored application data and the stored viewing confirmation data (such as Step S313 to be described later) in response to the fact that a request by a manager has been accepted (such as Step S309 to be described later).

According to the seventh aspect of the present invention, the computer is capable of displaying the stored application data and the viewing confirmation data in response to the fact that a request by a manager has been accepted.

This enables the manager to recognize whether or not the staff, to whom the recruitment contact has been transmitted, has viewed the recruitment contact. Accordingly, it is easy to effectively and efficiently contact the staff who has not viewed the recruitment contact yet, and who is willing to apply, while avoiding contact with staff who have already viewed the recruitment contact, and who are likely to have no intention of responding to recruitment at this time.

In an eighth aspect of the method according the seventh aspect of the present invention, the method further includes a schedule creation status display step for the computer to display schedule creation status data (such as FIG. 26) that represents a schedule creation status in response to the fact that a request by the manger has been accepted, on the basis of the assumed-schedule data, the requested-schedule data, and interim-schedule data (such as an interim-schedule data table in FIG. 11) that represents interim-schedule data of the plurality of staff on the basis of the assumed-schedule data and the requested-schedule data.

According to the eighth aspect of the present invention, the computer is capable of displaying schedule creation status data that represents a schedule creation status, on the basis of the assumed-schedule data, the requested-schedule data, and the interim-schedule data, upon a request by the manager.

This enables the confirmation of the schedule creation status at the time when the manager requests. Accordingly, it is possible to appropriately supplement the staff, for example, by confirming the staff who have not been assigned to a task, when the manager recruits staff again.

In a ninth aspect of the present invention, a program for causing a computer connected to a communications network (such as a internal communications network 3 and an external communications network 5) to manage a work schedule of a plurality of staff, the program causing the computer to perform: an assumed-schedule data generation step (such as Step S20 to be described later) of the computer (such as the server 1 and the manager terminal 2 to be described later) generating assumed-schedule data that represents an assumed schedule of the plurality of staff; a requested-schedule data acceptance initiation step (such as Steps S61 and S62 to be described later) of the computer designating a predetermined period and initiating acceptance of requested-schedule data that represents a requested-schedule of the plurality of staff from a terminal connected to the communications network; a requested-schedule data reception step (such as Step S69 to be described later) of the computer receiving and storing the requested-schedule data of the plurality of staff from the terminal; and a vacancy schedule data generation step of the computer generating and displaying vacancy schedule data (such as interim-schedule data to be described later) that represents a vacancy schedule of the plurality of staff on the basis of the assumed-schedule data and the requested-schedule data after the designated predetermined period has passed.

According to the ninth aspect of the present invention, an effect similar to the effect of the first aspect of the present invention can be expected by operating the computer.

In a tenth aspect of the program according to the ninth aspect of the present invention, the program further causes the computer to perform a recruitment contact data generation step (such as Step S115 to be described later) of the computer generating recruitment contact data (such as recruitment contact data to be described later) that represents staff for whom recruitment contact is performed on the basis of the vacancy schedule data and staff attribute data (such as operator skill data to be described later) that represents staff attributes of the plurality of staff.

According to the tenth aspect of the present invention, an effect similar to the effect of the second aspect of the present invention can be expected by operating the computer.

In an eleventh aspect of the program according to the tenth aspect of the present invention, the program further causes the computer to perform a recruitment contact data transmission enabling step of enabling the computer to transmit the recruitment contact data only to disclosed contact addresses of the staff via the communications network.

According to the eleventh aspect of the present invention, an effect similar to the effect of the third aspect of the present invention can be expected by operating the computer.

In a twelfth aspect of the program according to the tenth or eleventh aspect of the present invention, the program further causes the computer to perform an application data storing step (such as Step S137 to be described later) of the computer to storing application data (such as application data to be described later) in response to the fact that the application data has been received (such as Step S127 to be described later) from the staff for whom the recruitment contact has been performed via the communications network.

According to the twelfth aspect of the present invention, an effect similar to the effect of the fourth aspect of the present invention can be expected by operating the computer.

In a thirteenth aspect of the program as described in the tenth or eleventh aspect of the present invention, the program further causes the computer to perform an employment data generation step (such as Step S207 to be described later) of the computer generating employment data (such as employment data to be described later) that represents staff to be employed in response to the fact that the application data has been received from the staff for whom the recruitment contact has been performed via the communications network.

According to the thirteenth aspect of the present invention, an effect similar to the effect of the fifth aspect of the present invention can be expected by operating the computer.

In a fourteenth aspect of the program according to the twelfth aspect of the present invention, the program further causes the computer to perform a viewing confirmation data storing step of the computer storing viewing confirmation data (such as Step S119 to be described later) in response to the fact that the viewing confirmation data has been received from the terminal (such as Step S119 to be described later), the viewing confirmation data representing the fact that the terminal has accepted viewing by the staff for whom the recruitment contact has been performed.

According to the fourteenth aspect of the present invention, an effect similar to the effect of the sixth aspect of the present invention can be expected by operating the computer.

In a fifteenth aspect of the program according to the fourteenth aspect of the present invention, the program further causes the computer to perform an application/viewing status display step for the computer to display the stored application data and the stored viewing confirmation data (such as Step S313 to be described later) in response to the fact that a request by a manager has been accepted (such as Step S309 to be described later).

According to the fifteenth aspect of the present invention, an effect similar to the effect of the seventh aspect of the present invention can be expected by operating the computer.

In a sixteenth aspect of the program according to the fifteenth aspect of the present invention, the program further causes the computer to perform a schedule creation status display step of the computer displaying schedule creation status data (such as FIG. 26) that represents a schedule creation status in response to the fact that a request by the manger has been accepted, on the basis of the assumed-schedule data, the requested-schedule data, and interim-schedule data (such as interim-schedule data table in FIG. 11) that represents interim-schedule data of the plurality of staff on the basis of the assumed-schedule data and the requested-schedule data.

According to the sixteenth aspect of the present invention, an effect similar to the effect of the eighth aspect of the present invention can be expected by operating the computer.

In a seventeenth aspect of the present invention, a storage medium for storing the program as described in any one of ninth to sixteenth aspects of the present invention is provided.

According to the seventeenth aspect of the present invention, effects similar to the effects of the first to eighth aspects of the present invention can be expected by executing the program by inserting the storage medium to the computer.

Effects of the Invention

According to the present invention, the computer generates and displays vacancy schedule data that represents the vacancy schedule of the plurality of staff on the basis of the assumed-schedule data and the requested-schedule data, thereby enabling the manager to accurately carry out the recruitment contact.

BRIEF DESCRIPTION OF THE DRAWINGS

FIG. 5 is a diagram illustrating an assumed-schedule data table according to an example of the preferred embodiment of the present invention;

FIG. 8 is a diagram illustrating a requested-schedule data table according to an example of the preferred embodiment of the present invention;

FIG. 9 is a display example of a screen for inputting weekly holiday approval according to an example of the preferred embodiment of the present invention;

FIG. 11 is a diagram illustrating an interim-schedule data table according to an example of the preferred embodiment of the present invention;

FIG. 14 is a diagram illustrating a required skill data table according to an example of the preferred embodiment of the present invention;

FIG. 15 is a display example of an operator skill table according to an example of the preferred embodiment of the present invention;

FIG. 16 is a display example of personal information setting according to an example of the preferred embodiment of the present invention;

FIG. 17 is a display example of mail of recruitment contact data according to an example of the preferred embodiment of the present invention;

FIG. 20 is a diagram illustrating a viewing data table according to an example of the preferred embodiment of the present invention;

FIG. 22 is a diagram illustrating an employment data table according to an example of the preferred embodiment of the present invention;

FIG. 24 is a flowchart illustrating a flow of a (manual) process for creating employment determination/employment notification data according to an example of the preferred embodiment of the present invention;

FIG. 25 is a display example of a screen for inputting employment determination according to an example of the preferred embodiment of the present invention; and FIG. 26 is a display example of a screen of an interim-schedule data list according to an example of the preferred embodiment of the present invention.

PREFERRED MODE FOR CARRYING OUT THE INVENTION

Hereinafter, an example of a preferred embodiment of the present invention is explained based on the drawings.

Figure 1:
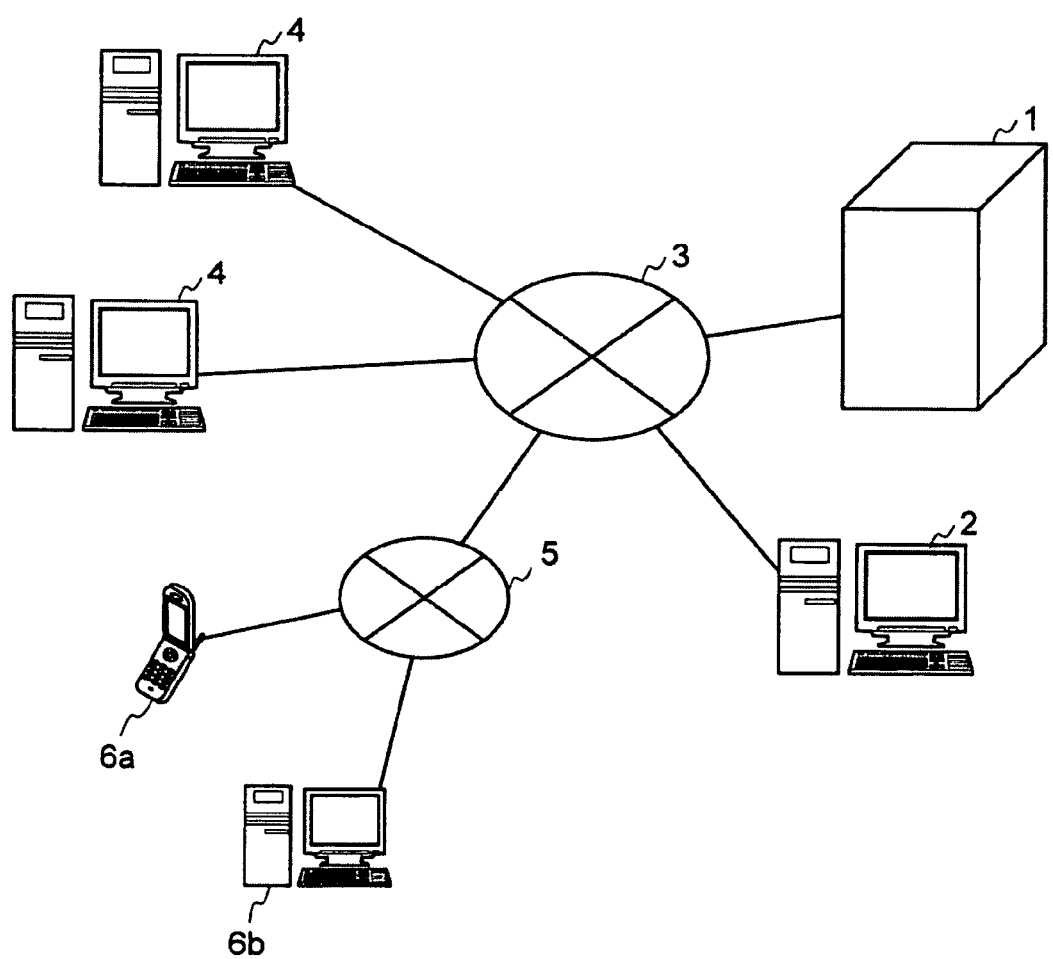
FIG. 1 is a conceptual diagram illustrating an overall configuration of a computer system according to an example of a preferred embodiment of the present invention.

FIG. 1 is a conceptual diagram illustrating an overall configuration of the computer system according to an example of a preferred embodiment of the present invention. In the present system, a server 1, a manager terminal 2, and operator terminals 4 are configured to be interconnected via an internal communications network 3. Moreover, these information devices may be further connectable to the intended-recruited-operator's portable units 6a and 6b via an external communications network 5. It should be noted that the numbers of the server 1, the manager terminal 2, the operator terminals 4, and the intended-recruited-operator's portable units 6a and 6b are arbitrary and selectable depending on the situation, in which these units configure the present system.

The server 1 manages this entire system, and performs data transmission to the operator terminals 4 and the like. The server 1 stores statistical data such as the number of past calls, personal information such as skills or contact addresses of the intended-recruited operators, evaluation information, schedule data and the like, and creates a schedule in response to a request from the manager terminal 2, the operator terminals 4.

It should be noted that a schedule refers to information with which the intended-recruited operators are assigned and the weekly holiday is managed regarding a predetermined unit of task. When this schedule is stored, it is referred to as schedule data. This schedule data includes assumed-schedule data and interim-schedule data. The assumed-schedule data is created in which the expected number of calls is calculated from the number of past calls, and the required number of intended-recruited operators is determined on the basis of the expected number of calls. The interim-schedule data is created in which allocation and recruitment of the operators are actually performed on the basis of the assumed schedule.

The manager terminal 2 requests the creation of a schedule to the server 1 on the basis of the input operation of the manager, assigns the intended-recruited operators, and manages the weekly holiday according to the schedule. Moreover, the manager terminal 2 accesses the server 1 at any time, sets up a schedule, and performs a creation request and a response regarding applications or recruitment of the operators.

The operator terminals 4 performs taking applications for weekly holidays, and applications for recruitment, or responses to the employment of the intended-recruited operators, to each of the schedules published by the server 1, on the basis of the input operation of the operators. With this respect, the operator's portable units 6a and 6b are similar to the operator terminals 4.

Figure 2:
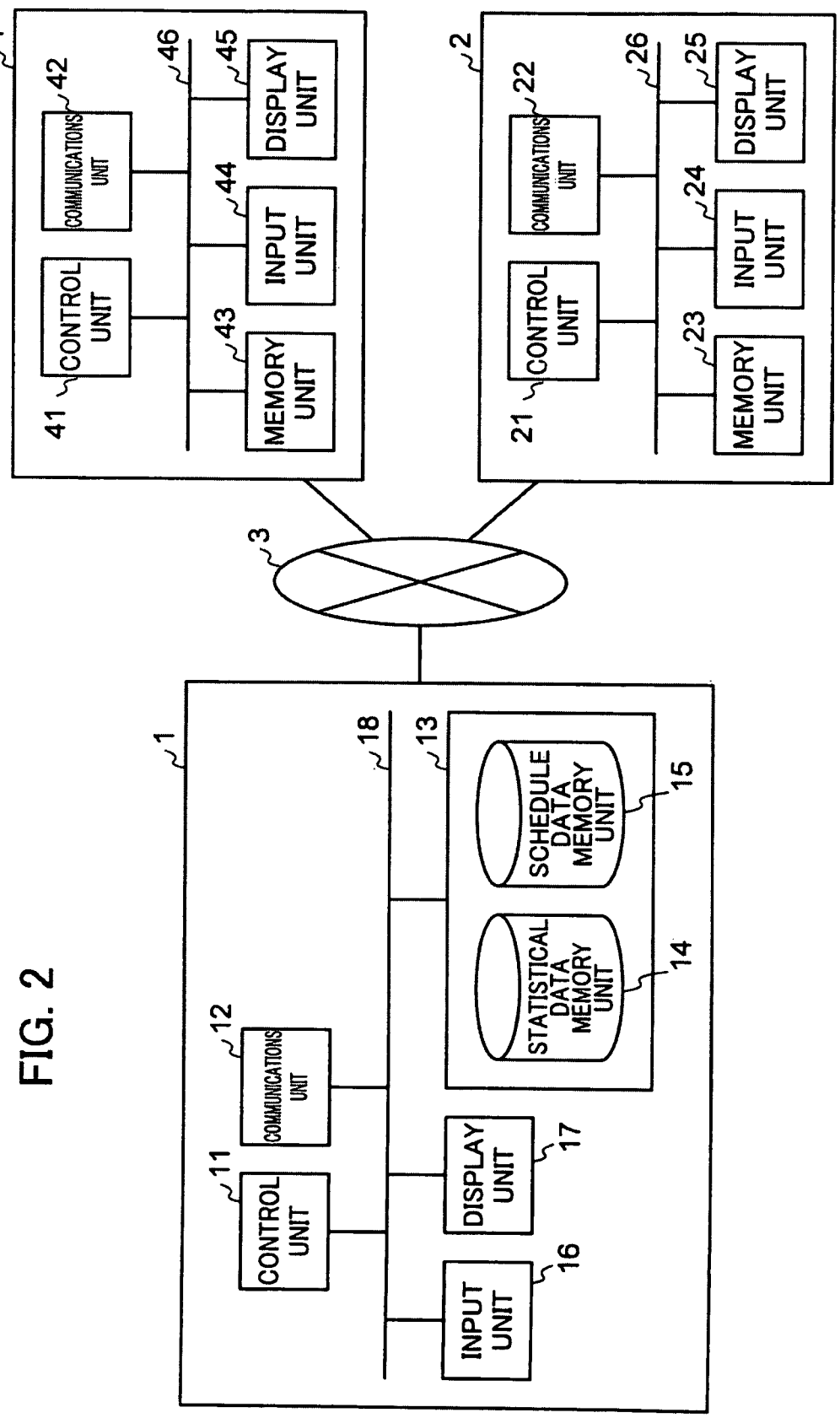
FIG. 2 is a block diagram illustrating the configuration of the computer system according to an example of the preferred embodiment of the present invention.

FIG. 2 is a block diagram illustrating a configuration of the server 1, the manager terminal 2, and the operator terminals 4, according to an example of the preferred embodiment of the present invention.

The server 1 is configured with a control unit 11, a communications unit 12, a memory unit 13, an input unit 16 and a display unit 17, each of the units being connected via a bus 18. Moreover, the memory unit 13 includes at least a statistical data memory unit 14 and a schedule data memory unit 15. The statistical data memory unit 14 stores statistical data such as the statistical data of the number of calls and the information on the intended-recruited operators. The schedule data memory unit 15 stores a variety of data for creating the assumed-schedule data, the interim-schedule data, and other schedule data. The variety of data for creating schedule data are, for example, recruitment contact data, application data, required-skill data, operator skill data, and intended-recruited operator data.

The control unit 11 is a central processing unit (CPU) which performs computing and processing of information, and controls the entire server 1. The control unit 11 appropriately reads and executes various programs stored in the memory unit 13, thereby collaborating with the aforementioned hardware and implementing various functions according to the present invention.

The memory unit 13 may include local memory to be used, in combination with the control unit 11, for executing the programs; large-capacity bulk memory; and cache memory to be used for efficiently searching the bulk memory. The memory unit 13 stores various programs to be executed by the control unit 11. A computer-readable medium for implementing the memory unit 13 may include a medium for electrical, magnetic, optical, or electromagnetic implementation. More specifically, the medium may include semiconductor memory, a magnetic tape, a magnetic disc, random access memory (RAM), read-only memory (ROM), and an optical disc including CD-ROM, CD-R/W and DVD. Moreover, the statistical data memory unit 14 and the schedule data memory unit 15, which are included in the memory unit 13, may be entities separated from the server 1.

The input unit 16 accepts input by the manager and the like, and may include a keyboard, a pointing device, and the like. The input unit 16 is capable of being connected to the server 1 directly or via an intervening I/O controller.

The display unit 17 displays a screen for accepting data input for the manager and the like, and displays a screen of the arithmetic processing results by the server 1. The display unit 17 includes a display device such as a cathode ray tube display (CRT), a liquid crystal display (LCD) and the like.

The communications unit 12 is a network adapter which enables the server 1 to connect with the operator terminals, the operator's portable units 6a and 6b or storage devices, via the internal communications network 3 or the external communications network 5. The communications unit 12 may include a modem, a cable modem and an Ethernet (registered trademark) adapter.

The manager terminal 2 is configured with a control unit 21, a communications unit 22, a memory unit 23, an input unit 24 and a display unit 25, the units being interconnected via a bus 26, respectively. The operator terminal 4 is configured with a control unit 41, a communications unit 42, a memory unit 43, an input unit 44 and a display unit 45, the units being interconnected via bus 46. Moreover, the operator's portable units 6a and 6b are also configured like the operator terminal 4.

The control units 21 and 41 are central processing units (CPU) which perform computing and processing of information, and perform overall control of the manager terminal 2 and the operator terminal 4, respectively. The control units 21 and 41 appropriately read and execute various programs stored respectively in the memory units 23 and 43, thereby collaborating with the aforementioned hardware and implementing various functions according to the present invention.

The memory units 23 and 43 may include local memory to be used, respectively, in combination with the control units 21 and 41, for executing the programs; a large-capacity bulk memory; and cache memory to be used for efficiently searching the bulk memory. The memory units 23 and 43 store various programs to be executed by the control units 21 and 41, respectively. A computer-readable medium for implementing the memory units 23 and 43 may include a medium for electrical, magnetic, optical, or electromagnetic implementation. More specifically, the medium includes semiconductor memory, a magnetic tape, a magnetic disc, random access memory (RAM), read-only memory (ROM), and an optical disc including CD-ROM, CD-R/W and DVD.

The input units 24 and 44 accept inputs by the manager and the like, and may include a keyboard, a pointing device and the like. The input units 24 and 44 are capable of being connected to the manager terminal 2 and the operator terminals 4 directly or via an intervening I/O controller.

The display units 25 and 45 display a screen for accepting data input for the manager and the like, and display a screen of the arithmetic processing results by the manager terminal 2. The display units 25 and 45 include a display device such as a cathode ray tube display (CRT), a liquid crystal display (LCD) and the like.

The communications units 22 and 42 are network adapters which enable the manager terminal 2 or the operator terminals 4 to connect with another arithmetic processing system or storage device, via the internal communications network 3 or the external communications network 5. The communications units 22 and 42 may include a modem, a cable modem and an Ethernet (registered trademark) adapter.

Figure 3:
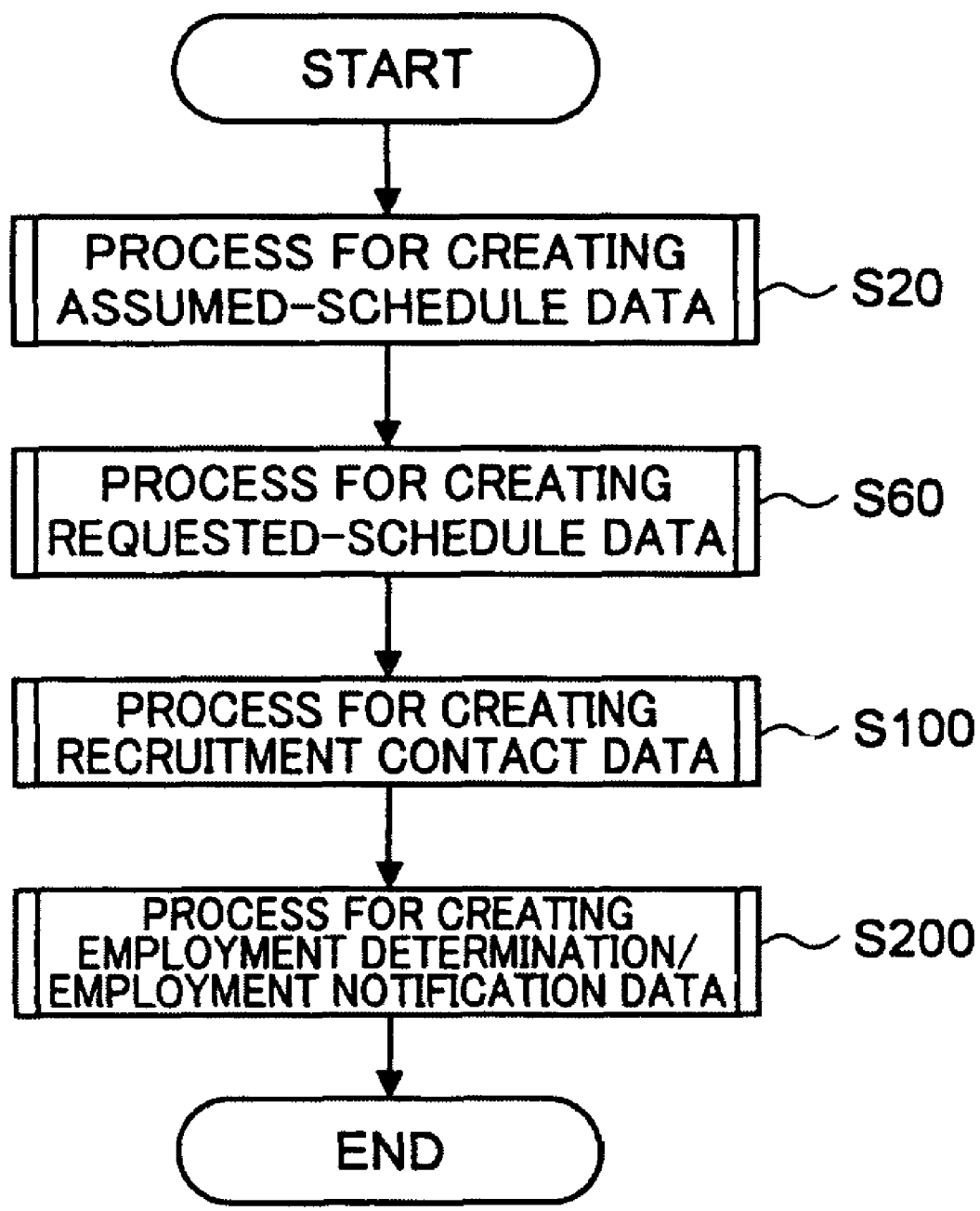
FIG. 3 is a flowchart illustrating a main flow according to an example of the preferred embodiment of the present invention.

FIG. 3 is a main flow of creating a schedule according to an example of the preferred embodiment of the present invention. Hereinafter, a description is provided based on the drawings.

In Step S20, a process for creating assumed-schedule data is performed. In this process, for example, the server 1, which has received an assumed-schedule-creating request from the manager terminal 2, calculates predicted-number-of-calls data from the number-of-calls statistical data, and creates assumed-schedule data on the basis of the predicted-number-of-calls data. The details about this process are described later. In a case where this process is completed, the process advances to Step S60.

In Step S60, a process for creating requested-schedule data is performed. In this process, for example, the server 1 transmits, in response to a request from the operator terminal 4, the assumed-schedule data created in Step S20, and creates requested-schedule data taking into consideration the weekly holiday request information of the intended-recruited operators and the like, the information being transmitted from the operator terminal 4. The details about this process are described later. In a case where this process is completed, the process advances to Step S100.

In Step S100, a process for creating recruitment contact data is performed. In this process, for example, the server 1, which has received the recruitment-contact-data-creating request from the manager terminal 2, obtains information on the number of staff lacking from the interim-schedule data, and determines operators to be recruited on the basis of the required-skill data and the operator skill data. The server 1 then creates recruitment contact data for the intended-recruited operators and transmits the recruitment contact data to the intended-recruited operators. In addition, the server 1 receives and stores the application data transmitted from the operator terminals 4. The details about these processes are described later. In a case where this process is completed, the process advances to Step S200.

In Step S200, a process for creating employment-determination/employment-notification data is performed. In this process, for example, the server 1 determines operators to be employed on the basis of the application data and the recruitment contact data received from the operator terminals 4, creates employment data, and creates and transmits employment notification data on the basis of the employment data. These processes are described later. In a case where this process is completed, the main flow is completed.

Figure 4:
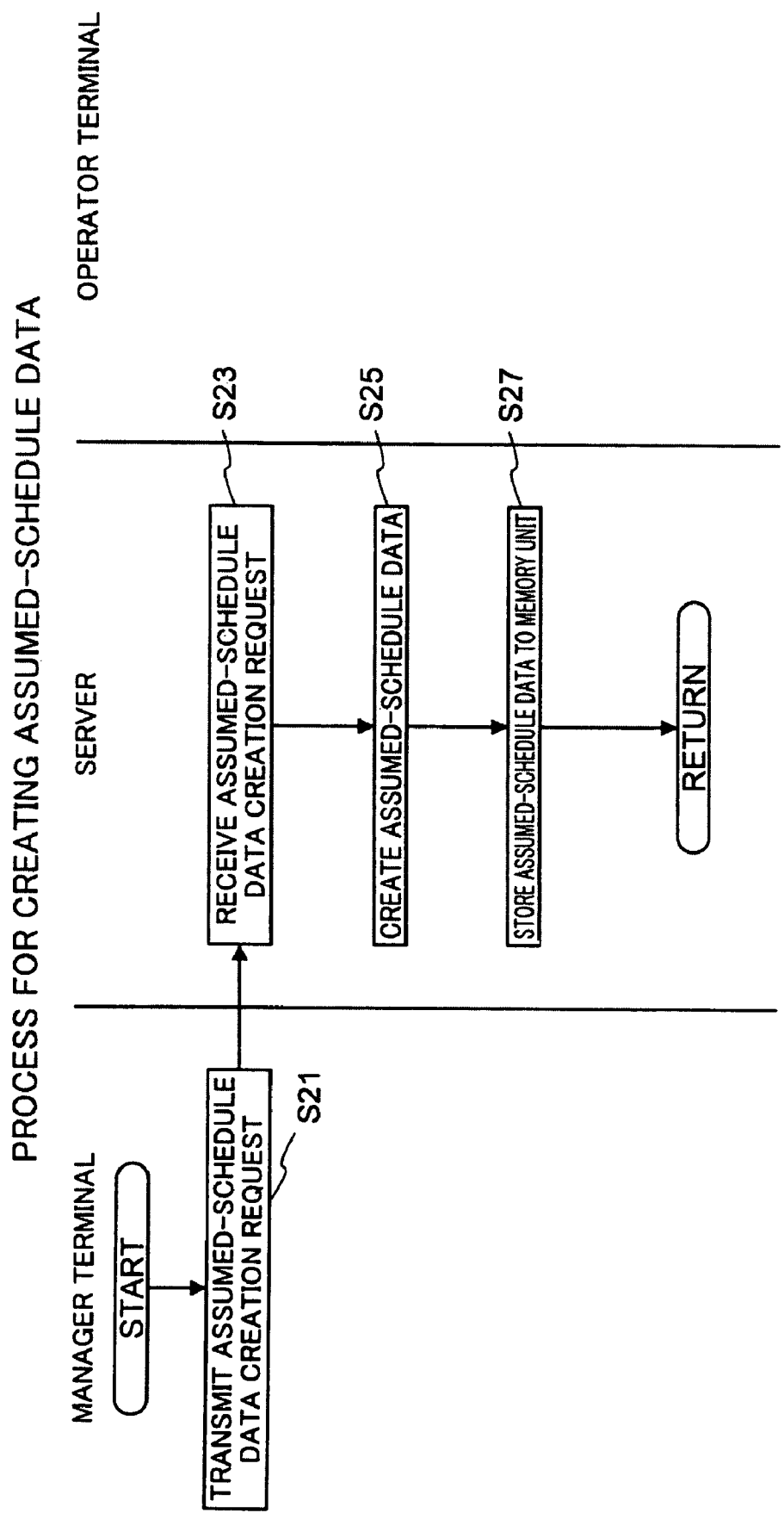
FIG. 4 is a flowchart illustrating a flow of a process for creating assumed-schedule data according to an example of the preferred embodiment of the present invention.

FIG. 4 is a diagram illustrating a subroutine flow of a process for creating assumed-schedule data according to an example of the preferred embodiment of the present invention. Hereinafter, the process for creating the assumed-schedule data is explained based on FIG. 4 and FIG. 5.

At first, at the manager terminal 2, in response to the input operation of the manager, the control unit 21 of the manager terminal 2 transmits the assumed-schedule data creation request signal to the server 1 via the communications unit 22 (Step S21). The control unit 11 of the server 1 receives the assumed-schedule data creation request signal via the communications unit 12 (Step S23).

In Step S25, the control unit 11 of the server 1 creates assumed-schedule data in response to reception of the assumed-schedule data creation request signal. Specifically, for example, this process may by performed in such a way that the number-of-calls statistical data is read from the statistical data memory unit 14, and the predicted number of calls is calculated, thereby calculating the required number of operators to be recruited, which is assumed from the predicted number of calls. The number-of calls-statistical data is, for example, a record of the number of calls on a certain day in the past, the record being indicated by every time period. The number-of-calls statistical data, which is read by the server 1, may be designated by the manager when the assumed-schedule-data-creating request is transmitted in Step S21, or the number-of-calls statistical data of the most recent date, or the same day of week in the most recent past may be automatically selected and read by the server 1. In a case where this process is completed, the process proceeds to Step S27.

For example, this assumed-schedule data is expressed in a table such as FIG. 5. An assumed-schedule data table of FIG. 5 is a table for showing the required numbers of intended-recruited operators assumed by every time period on a certain day. For example, FIG. 5 shows that the required number of intended-recruited operators at 9:00 AM on August 1st is 26.5.

In Step S27, the control unit 11 stores the assumed-schedule data to the schedule data memory unit 15 of the memory unit 13. In a case where this process is completed, this subroutine is completed, and the process advances to Step S60 of FIG. 3.

Figure 6:
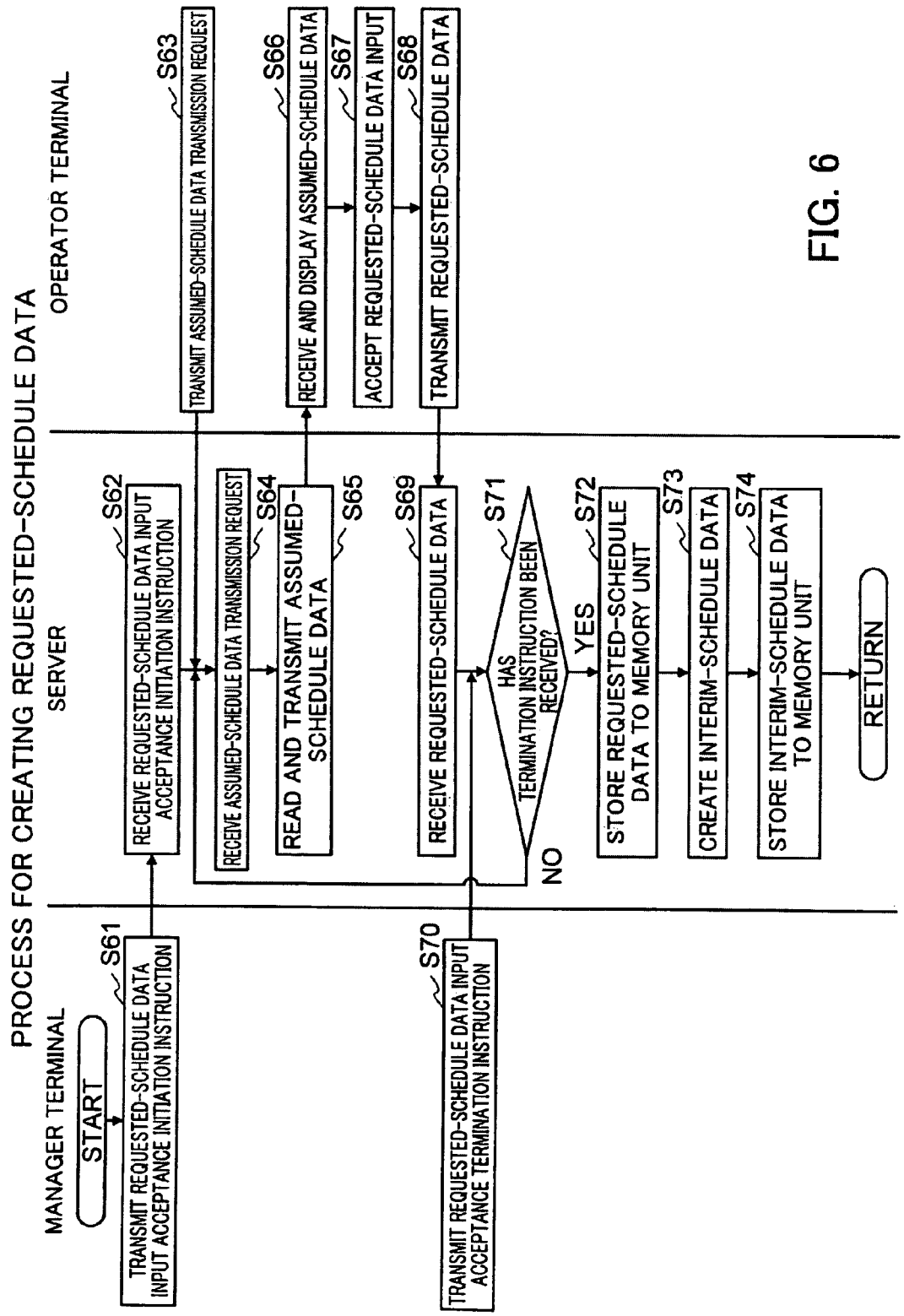
FIG. 6 is a flowchart illustrating a flow of a process for creating requested-schedule data according to an example of the preferred embodiment of the present invention.

FIG. 6 is a flowchart for showing a subroutine of a process for creating requested-schedule data according to an example of the preferred embodiment of the present invention. Hereinafter, the process for creating the requested-schedule data is explained based on FIGS. 6 to 11.

At first, in Step S61, the control unit 21 of the manager terminal 2 transmits a requested-schedule data input acceptance initiation instruction signal to the server 1 via the communications unit 22. The control unit 11 of the server 1 receives the requested-schedule data input acceptance initiation instruction signal via the communications unit 12, and starts receiving from the operator terminal 4 (Step S62).

In Step S63, the control unit 41 of the operator terminal 4 transmits an assumed-schedule data transmission request signal via the communications unit 42. Upon receiving the assumed-schedule data transmission request signal via the communications unit 12 (Step S64), the control unit 11 of the server 1 reads the assumed-schedule data from the schedule data memory unit 15, and transmits the data to the operator terminal 4 via the communications unit 12 (Step S65).

Figure 7:
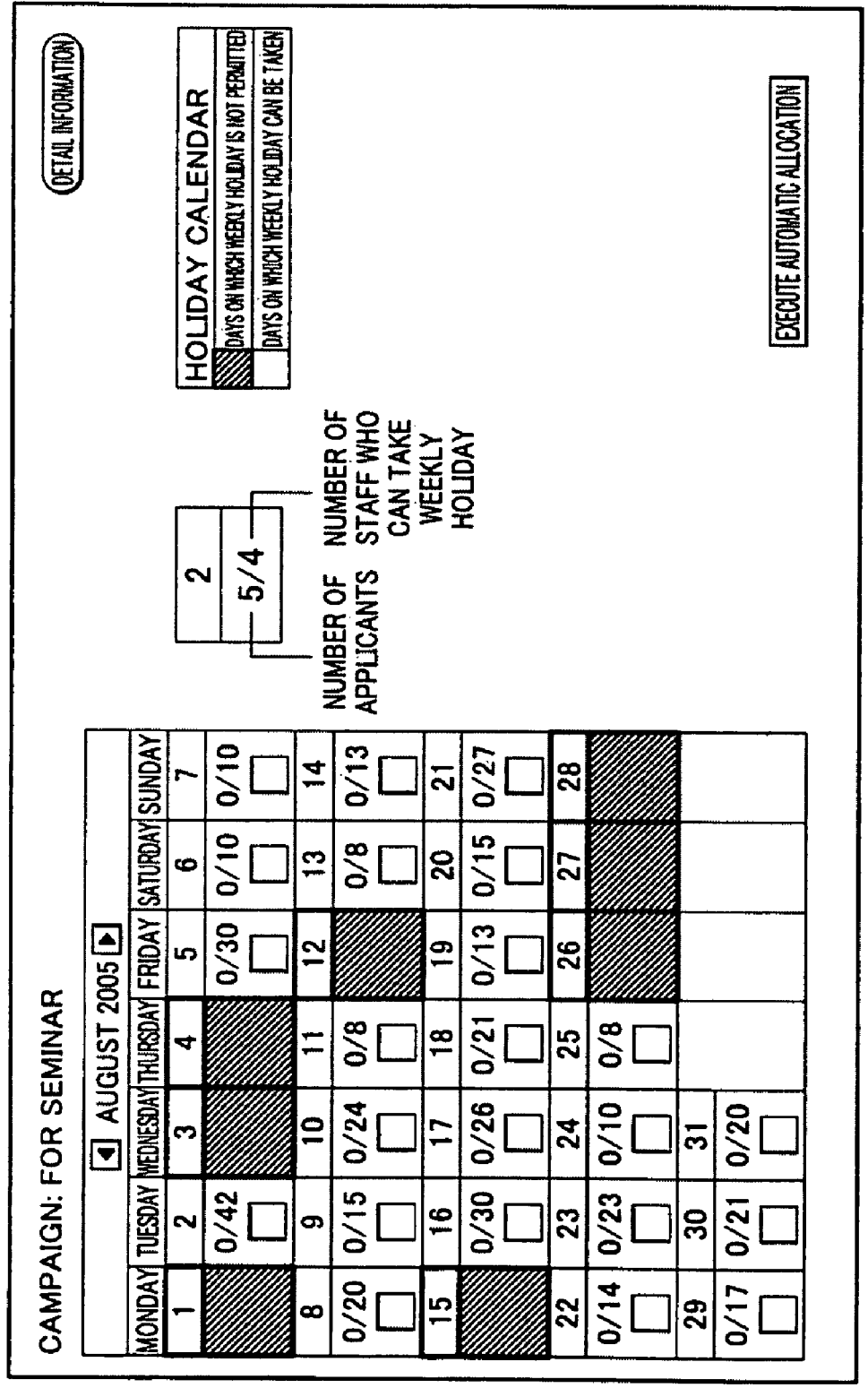
FIG. 7 is a display example of a screen for inputting a weekly holiday application according to an example of the preferred embodiment of the present invention.

In Step S66, the control unit 41 of the operator terminal 4 receives the assumed-schedule data from the server 1, and displays the data on the display unit 45. The intended-recruited operators consider the requested-schedule data via the input unit 44, while viewing at the data. More specifically, for example, this is performed on such a screen as shown in FIG. 14 for setting requests for weekly holidays. FIG. 7 shows the number of staff who can take weekly holidays, and the number of current applicants for weekly holidays. The intended-recruited operators input weekly holiday requests referring to this. The screen displayed on the display unit 45 may be updated at least each time the server 1 receives weekly holiday data transmitted by other intended-recruited operators. The control unit 41 of the operator terminal 4 accepts the requested schedule input by the intended-recruited operators (Step S67).

In Step S68, the control unit 41 of the operator terminal 4 creates requested-schedule data from the input accepted so far in Step S67, and transmits the data to the server 1 via the communications unit 42. It should be noted that this transmission can be performed for an arbitrary number of times until the server 1 receives a requested-schedule data input acceptance termination instruction signal (the details of which are described later). This transmission number of times may be a predetermined number of times for each of the intended-recruited operators, or may be unlimited. In a case where this process is completed, the process advances to Step S69. The number of times the requested-schedule data can be transmitted, as well as the number of times each order of priority can be transmitted, may be adjustable for each of the intended-recruited operators by the manager's input. In this case, the manager will adjust these parameters in consideration of evaluation and working achievement of each of the intended-recruited operators in the past.

In Step S69, the control unit 11 of the server 1 receives the requested-schedule data transmitted from the operator terminal 4. The requested-schedule data transmitted from each operator terminal 4 is then registered to a requested-schedule data table. For example, a requested-schedule data table such as FIG. 8 is created. IDs and operator names of the intended-recruited operators, and requested days of the weekly holiday are registered to this table.

This acceptance of the requested-schedule data is performed until the requested-schedule data input acceptance termination instruction signal is transmitted from the manager terminal 2 to the server 1 (Step S70). This requested-schedule data input acceptance termination instruction signal may be transmitted when the control unit 21 receives a transmission instruction that has been input from the input unit 24 by the manager at the manager terminal 2. Alternatively, a predetermined period is defined beforehand, and the acceptance of the requested-schedule data input may be automatically terminated when the predetermined period has passed.

In Step S71, the control unit 11 determines whether or not the requested-schedule data input acceptance termination instruction signal has been received from the manager terminal 2. In a case where the requested-schedule data input acceptance termination instruction signal is not received, the process returns to Step S63 or S64, and the assumed-schedule data request from the operator terminal 4 or the requested-schedule data acceptance is continued. In a case where the requested-schedule data input acceptance termination instruction signal is received, a registered requested-schedule data table is stored in the schedule data memory unit 15 (Step S72).

In Step S73, the control unit 11 creates interim-schedule data. More specifically, for example, the control unit 11 may transmit the requested-schedule data table to the manager terminal 2 in response to a request from the manager terminal 2, and then a screen such as FIGS. 9 and 10 may be displayed on the display unit 25. In such a case, for example, the control unit 21 displays a screen such as FIG. 9 on the display unit 25 of the manager terminal 2. On the screen of FIG. 9, the number of staff who can take weekly holidays, the number of current applicants for weekly holidays, and the names of operators who have applied for weekly holidays are displayed on the basis of the information of the requested-schedule data table, which has been stored in the control unit 11 of the server 1 in Step S72. The control unit 21 may set up authorization of the weekly holiday acquisition by accepting the input of the selection check box from the manager.

Figure 10:
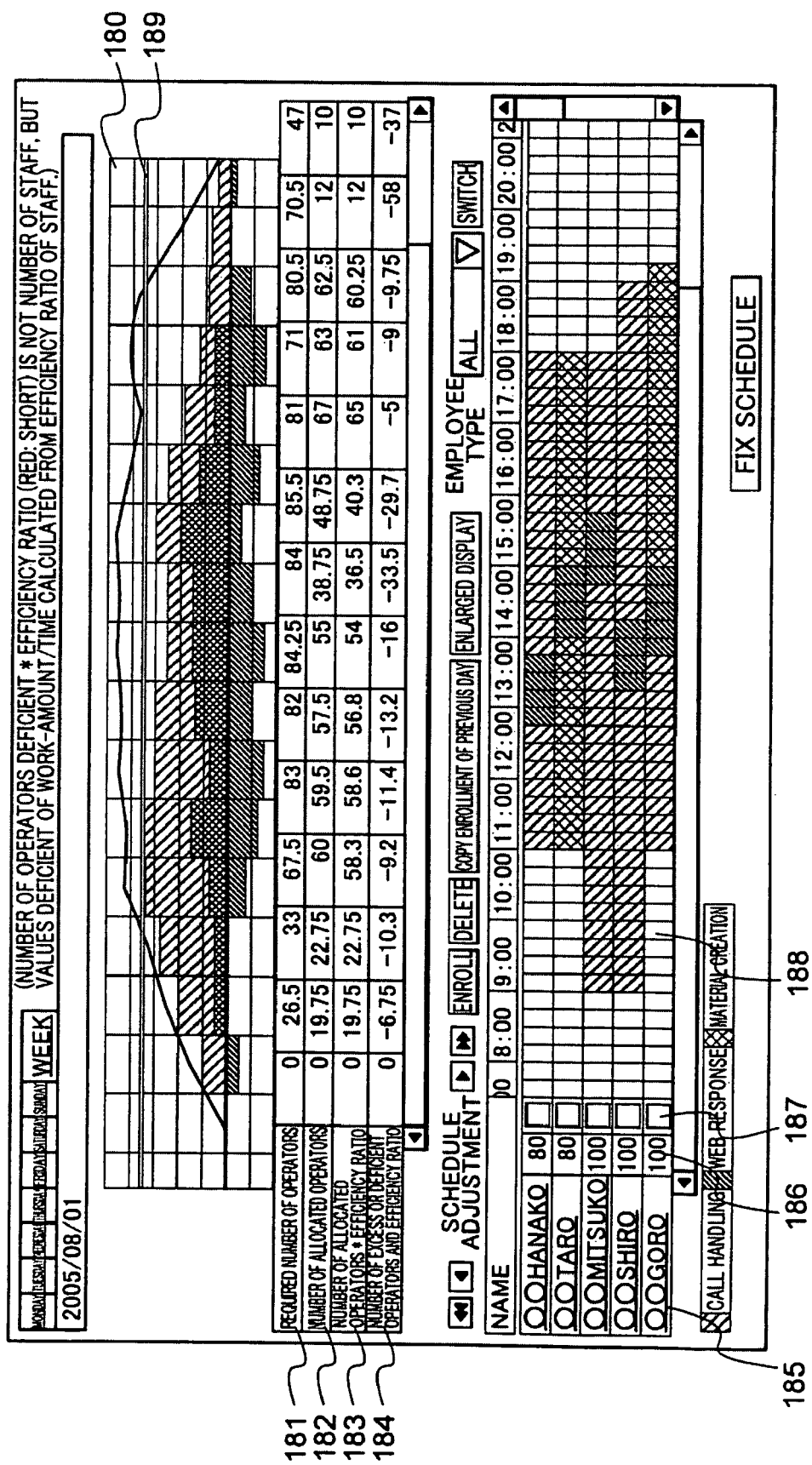
FIG. 10 is a display example of a screen for creating an interim schedule according to an example of the preferred embodiment of the present invention.

In addition, the control unit 21 displays a screen such as FIG. 10 on the basis of the received requested-schedule data table, and accepts the input of the decision by the manager regarding the operators to be employed. This screen shows a graph 180, a line 189 showing the maximum number of operators that can be allocated, an assumed required number 181 of operators, a number 182 of allocated operators who can work (the number in relation to the number of required operators), a number 183 obtained by multiplying the number of allocated operators and an efficiency ratio, and a number 184 obtained by multiplying a number of excess or deficient operators and the efficiency ratio. The number 183 obtained by multiplying the number of allocated operators and the efficiency ratio, and the number 184 obtained by multiplying the number of excess or deficient operators and the efficiency ratio are values of work-amount/time calculated from a processing efficiency 186 of the intended-recruited operators. Here, regarding the time period when the assumed number of the intended-recruited operators does not reach the required number of operators, negative numbers are displayed in the number 184 (the number of excess or deficient operators*the efficiency ratio), and it is indicated that the number of intended-recruited operators is insufficient. At the same time, a negative indication is made in a bar chart 188. Moreover, in the number 184 (the number of excess or deficient operators*the efficiency ratio), the number deficient of the maximum number of operators that can be allocated may be displayed. For example, in a case where the maximum number of operators is the number of seats, the manager can recognize whether or not the number of seats is enough for the current required number of operators.

In table 185 below, names of the intended-recruited operators 185 who can work, and processing efficiency 186 of the intended-recruited operators are displayed. The control unit 21 of the manager terminal 2 accepts the input by the manager regarding the operators to be employed. For example, the input is accepted by checking, by use of the input unit 24, a check box 187 in the line where the name of the operator who is desired to be employed is displayed (Step S73). It should be noted that the values may be changed in response to the acceptance of the check in the check box 187 input by the manager, the values regarding the graph 180, the number 182 of the allocated operators, the number 183 (the allocated number of operators*the efficiency ratio), the number 184 (the number of excess or deficient operators*the efficiency ratio) and the like. The manager will employ the intended-recruited operators so that the number (the allocated number of operators*the efficiency ratio) exactly satisfies the required number of operators.

Moreover, the bar chart 188 shows a schedule which has already been set up for each of the intended-recruited operators. In this bar chart 188, task classification may be differentiated by colors, whereby the kind of task currently assigned can be identified. This makes it possible to perform flexible schedule management, in which, for example, the intended-recruited operators, who are assigned to a task with low immediacy such as creating materials or Web replies, are assigned as call operators when the number of calls is high.

In this way, the manager creates an interim schedule by using these screens. In a case where this process is completed, the process advances to Step S74.

It should be noted that the interim-schedule data table (FIG. 11) shows the required number of operators, the operating ratio, the interim number of operators and the number of excess or deficient operators in a certain time period of a certain day. For example, during the period from 9:00 to 10:00 AM on November 1, the required number of intended-recruited operators is 26.5, the current number of allocated operators is 19.75, and the number of excess or deficient operators is – (minus) 6.75. In this way, the interim-schedule data includes the interim number of staff (intended-recruited operators) to be allocated includes the number of excess or deficient operators which is a difference from the required number of operators, and indicates the number of allocated operators and the number of excess or deficient operators on a day and/or time period. Moreover, this number of excess or deficient operators may be calculated from the processing efficiency of the intended-recruited operators.

The control unit 11 of the server 1 may store the interim-schedule data thus generated in Step S73 (FIG. 11) in the schedule data memory unit 15 (Step S74). In a case where this process is completed, this subroutine is completed, and the process advances to Step S100 of FIG. 3.

Figure 12:
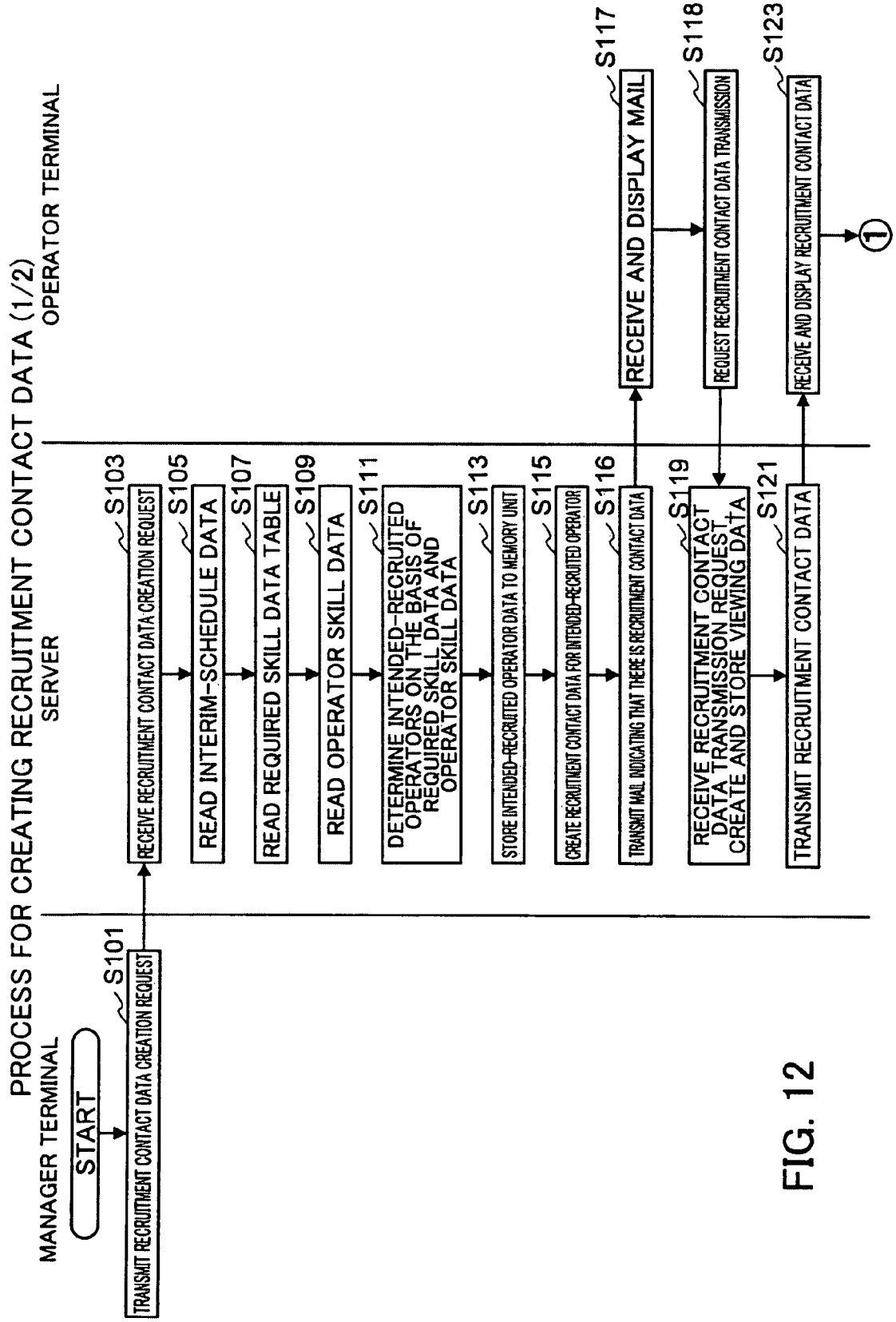
FIG. 12 is a flowchart illustrating a flow of a process for creating recruitment contact data according to an example of the preferred embodiment of the present invention.
Figure 13:
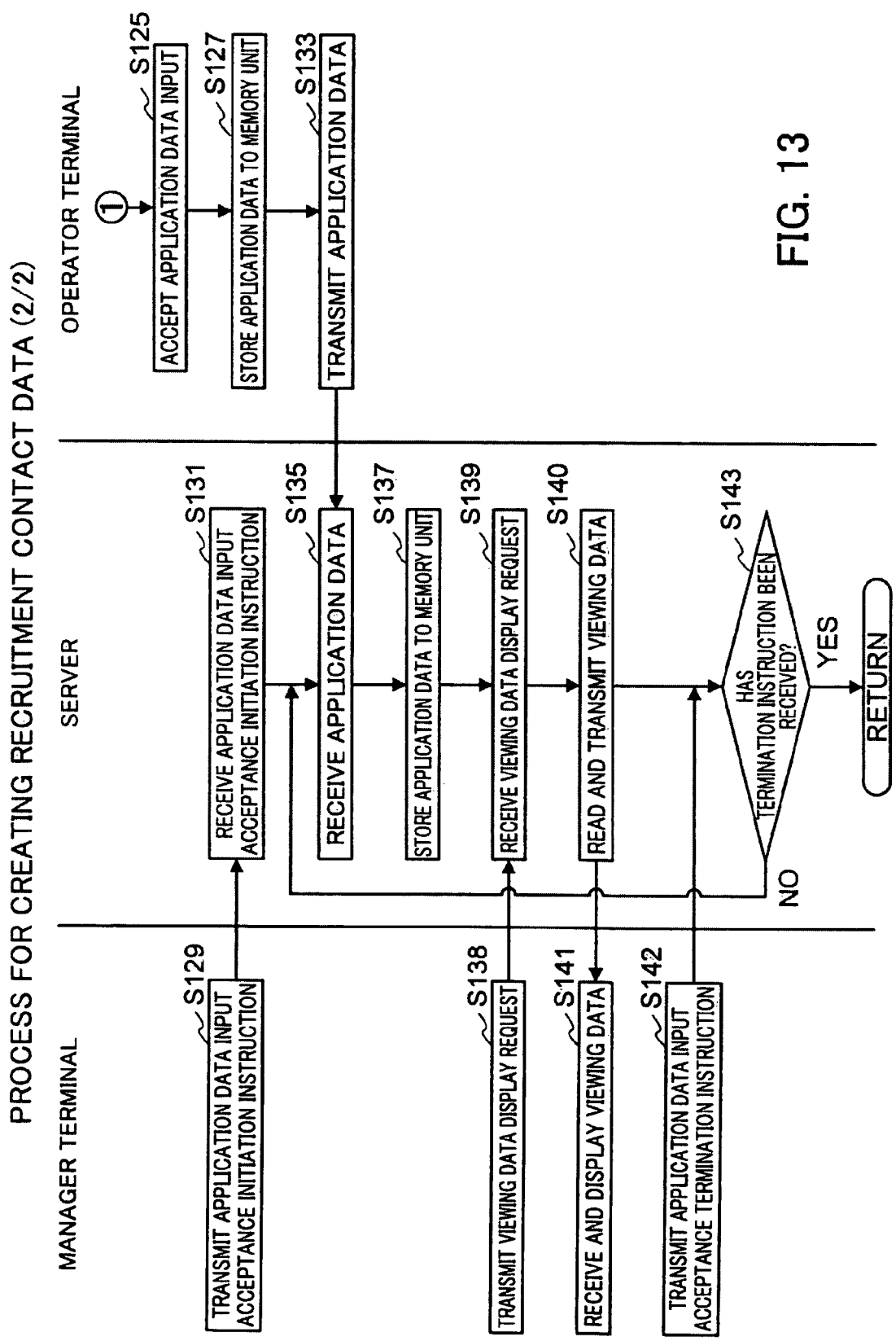
FIG. 13 is a flowchart illustrating a flow of a process for creating recruitment contact data according to an example of the preferred embodiment of the present invention'

FIG. 12 is a flowchart illustrating a flow of a process for creating recruitment contact data according to an example of the preferred embodiment of the present invention. Hereinafter, the process for creating the recruitment contact data is explained based on FIGS. 12 to 20.

At first, the control unit 21 of the manager terminal 2 transmits a recruitment contact data creation process request signal to the server 1 via the communications unit 22 (Step S101). The control unit 11 of the server 1 receives the recruitment contact data creation process request signal (Step S103), and reads the interim-schedule data from the schedule data memory unit 15 (Step S105).

In Step S107, the control unit 11 of the server 1 reads the required skill data for the task schedule regarding the recruitment, and further reads the operator skill data of the registered intended-recruited operators (Step S109). For example, this required skill data is shown in a table in FIG. 14. In this table, the schedules correspond to the required skills, respectively. For example, "server skills" and "English skills" are required for schedule A, no specific skill are required for schedule B, and "Chinese skills" are required for schedule C.

Moreover, the operator skill data is shown, for example, in a table such as FIG. 15. The table of FIG. 15 shows department names, full names, IDs, employment types, and holding skills of the intended-recruited operators. It should be noted that the intended-recruited operators can register a personal mail address or telephone number as a contact address in addition to the aforementioned personal information. The personal mail address and the like can be designated as a destination address for sending the recruitment contact data. In addition, it is also possible to make such personal information private from the manager and the like. More specifically, for example, as shown in FIG. 16, the personal information such as the contact address is registered, and it is selected whether to disclose or hide the information by the presence or absence of a check in a check box 90.

In Step S111, the control unit 11 determines intended-recruited operators on the basis of the required skill data and the operator skill data. For example, this determination may be made by comparing the required skill data and the operator skill information on the intended-recruited operators included in the operator skill data, thereby designating the operators who satisfy the required skills as the intended-recruited operators. Moreover, these pieces of information may be transmitted to the manager terminal 2 and displayed, the manager may designate the intended-recruited operators at the manager terminal 2, thereby making a determination, and the determined data may be transmitted to the server 1. In a case where this process is completed, the process advances to Step S113.

In Step S113, the control unit 11 stores the intended-recruited operator data to the schedule data memory unit 15 of the memory unit 13, and the process advances to Step S115.

In Step S115, the control unit 11 creates recruitment contact data for the intended-recruited operators. Next, in Step S116, the control unit 11 transmits mail to the intended-recruited operators via the communications unit 12, the mail indicating that there is information regarding the recruitment contact, and the process advances to Step S117. In Step S117, the control unit 41 of the operator terminal 4 receives the mail from the server 1, and displays the data on the display unit 45. In response to the fact that the intended-recruited operator has viewed the mail, and that a recruitment contact data transmission request by the operator has been accepted, the control unit 41 transmits a recruitment contact data transmission request signal (Step S118).

More specifically, for example, there are methods such as follows. As shown in FIG. 17, as a first method, in cases where recruitment contact data has been transmitted as mail to be viewed on the Web, a confirmation button 221 is displayed when the recruitment contact data mail transmitted via the Web server is displayed on the display unit 45 by the control unit 41 of the operator terminal 4. In response to the fact that the intended-recruited operator has clicked the confirmation button 221 via the input unit 44, the control unit 41 transmits viewing data to the server 1 from the Web server, the viewing data indicating that the data has been viewed. Moreover, in cases where the control unit 41 has accepted the clicking of an application button 222, the control unit 41 similarly transmits the viewing data from the Web server to the server 1.

Figure 18:
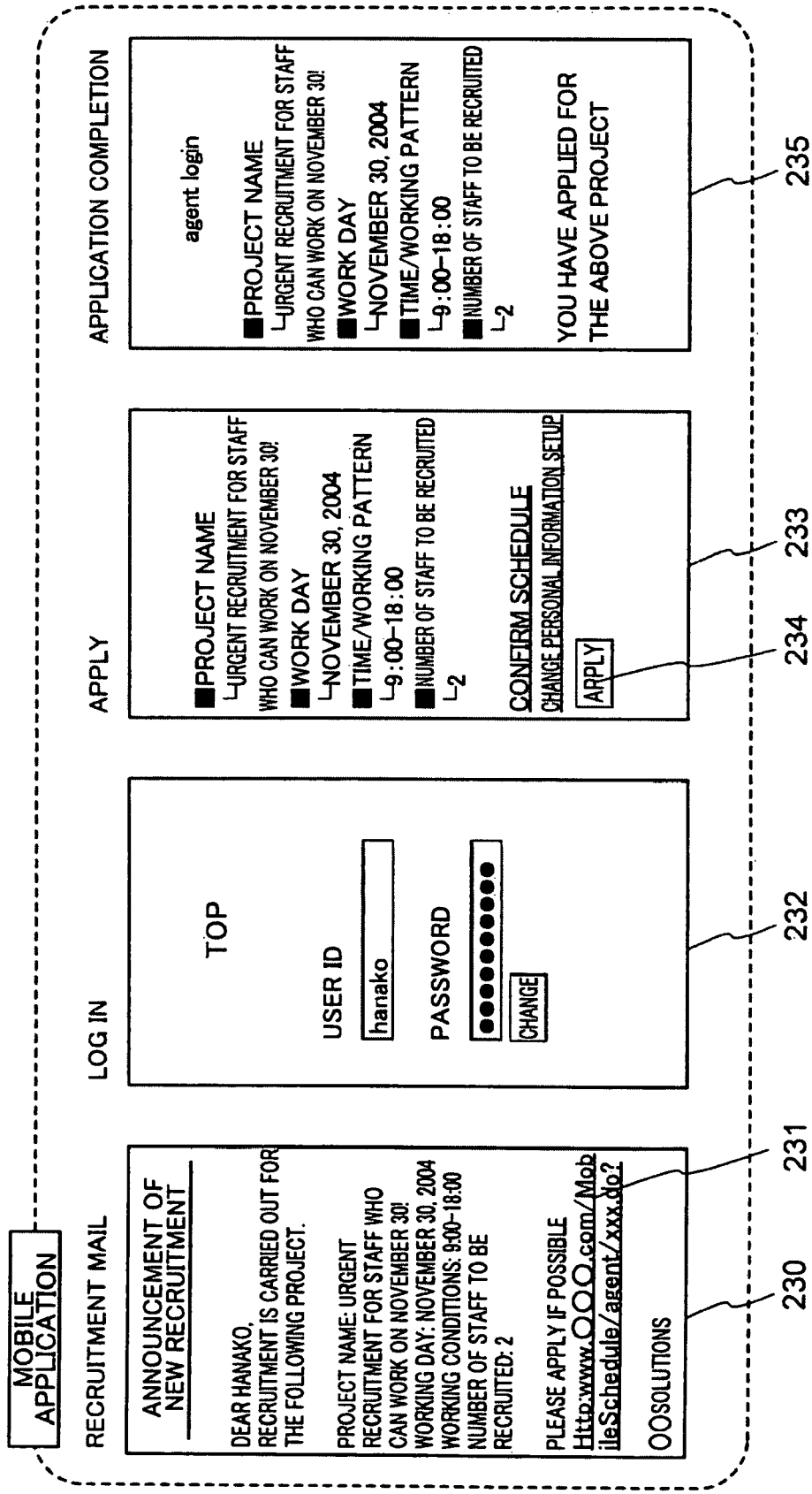
FIG. 18 is a display example of mail of recruitment contact data according to an example of the preferred embodiment of the present invention.

Moreover, as a second method, in cases where a mail server transmits recruitment contact data to the portable units 6a and 6b of the intended-recruited operators via the external communications network 5, screens such as that shown in FIG. 18 are displayed on the display unit of the portable units 6a and 6b. For example, at first, an announcement screen 230 regarding the recruitment is displayed, and a predetermined URL 231 is indicated on the announcement screen 230. When the control unit 41 of the portable units 6a and 6b accepts a selection of the URL 231 by the intended-recruited operator, the Web server transmits a login screen 232 via the external communications network 5. Furthermore, when the portable units 6a and 6b accept the input of ID and password by the intended-recruited operator and log into the Web server, the Web server transmits an application screen 233 to the portable units 6a and 6b. Since this indicates that the intended-recruited operator has viewed the recruitment contact data, the Web server transmits the application screen 233 to the portable units 6a and 6b, and also transmits the viewing data to the server 1. Moreover, the portable units 6a and 6b, which have received the application screen 233, display the application screen 233 on the display unit 45, and display an application button 234 on the application screen 233. In cases where the selection of the application button 234 by the intended-recruited operator is accepted, the control unit 41 of the portable units 6a and 6b may transmit the application data from the external communications network 5 to the server 1 via the Web server. Furthermore, the server 1, which has received the application data, may transmit the fact that the application has been completed, to the portable units 6a and 6b via the Web server and the external communications network 5. The control unit 41 of the portable units 6a and 6b may then display an application completion screen 235 on the display unit 45.

The control unit 11 of the server 1 receives the viewing data and a recruitment contact transmission request signal (Step S119). In a case where this process is completed, the process advances to Step S121.

In Step S121, the control unit 11 of the server 1 transmits the recruitment contact data in response to a request from the control unit 41 of the operator terminal 4 (Step S118). The control unit 41 of the operator terminal 4 receives the recruitment contact data via the communications unit 42, and displays it on the display unit 45 (Step S123). It should be noted that the recruitment contact data may be automatically transmitted in response to the determination from the mail server to the portable units 6a and 6b of the intended-recruited operators via the external communications network 5. The control unit 41 accepts the application data input operation by the intended-recruited operators as a response to the recruitment contact data (Step S125, FIG. 13), and stores it to the memory unit 43 (Step S127). After the server 1 has transmitted the recruitment contact data, the control unit 21 of the manager terminal 2 transmits an application data acceptance initiation instruction signal to the server 1 (Step S129). The control unit 11 of the server 1 receives the application data acceptance initiation instruction signal, and initiates acceptance of the application data (Step S131).

The control unit 41 of the operator terminal 4 transmits the application data to the server 1 via the communications unit 42 (Step S133). It should be noted that this application data may include not only a response indicating that the intended-recruited operator has applied for the recruitment, but also a response indicating that the intended-recruited operator has not applied for the recruitment. In a case where this process is completed, the process advances to Step S135.

In Step S135, the control unit 11 of the server 1 receives the application data transmitted by the operator terminal 4 via the communications unit 12. Then, it is stored in the schedule data memory unit 15 (Step S137). This reception is continued until the manager terminal 2 transmits an application data acceptance termination instruction signal (Step S139). Alternatively, a predetermined period may be set up beforehand, and the reception may be automatically terminated after the predetermined period has passed from the initiation of the reception.

It should be noted that the control unit 11 of the server 1 may transmit data indicating the current status of the accepted application data to the manager terminal 2 and display it on the display unit 45 of the manager terminal 2 in response to a request from the manager terminal 2 (Step S138) during the period from the initiation of the acceptance of application data until the reception of the application data input acceptance termination instruction signal. In this case, the control unit 21 of the manager terminal 2 transmits a viewing data display request signal to the server 1 (Step S138). The control unit 11 of the server 1 receives the viewing data display request signal (Step S139), reads the viewing data from the memory unit 23, and transmits the viewing data to the manager terminal 2 (Step S140). The control unit 21 of the manager terminal 2, which has received the viewing data, displays the viewing data on the display unit 25 (Step S141).

Figure 19:
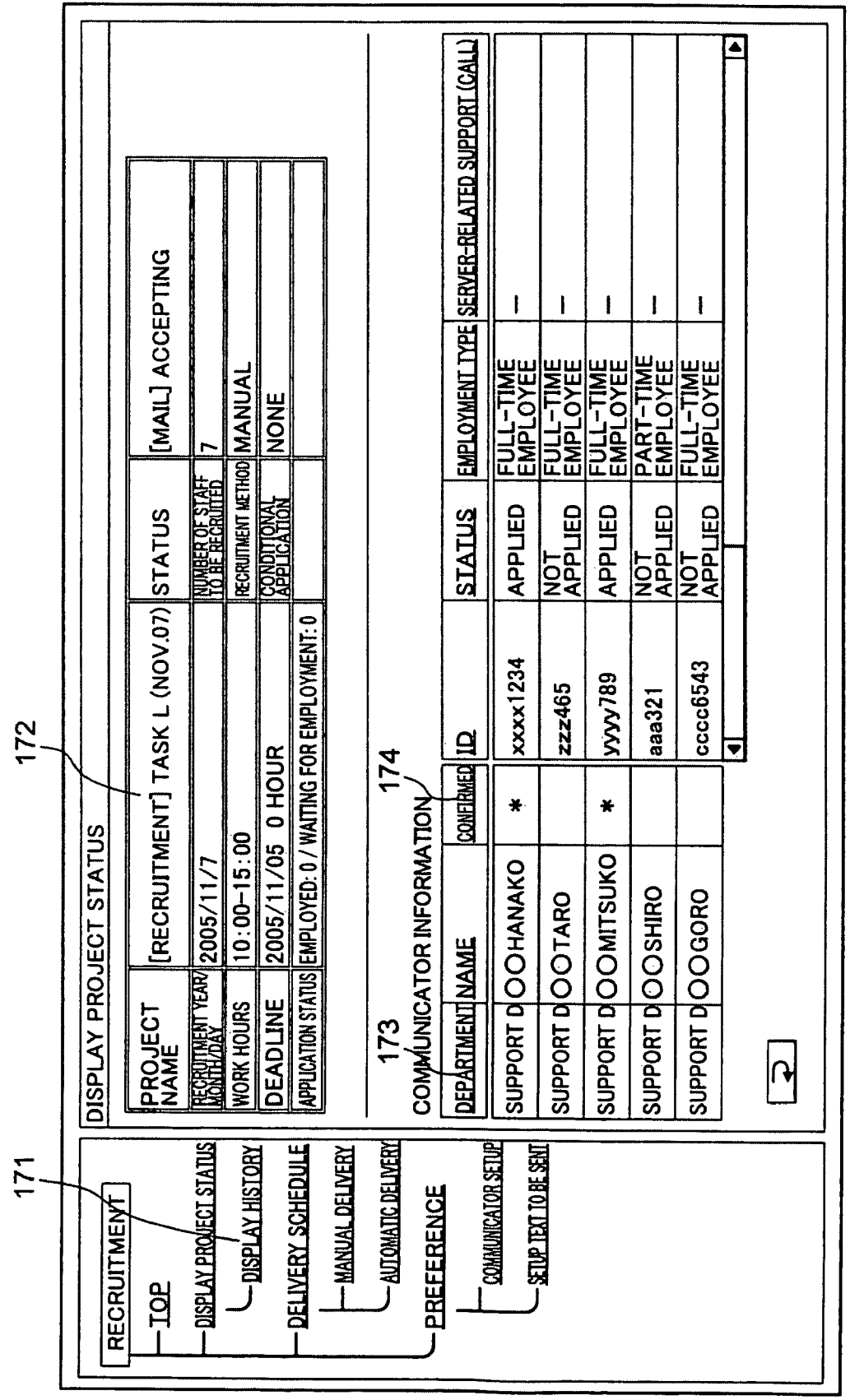
FIG. 19 is a display example of a project status display screen for according to an example of the preferred embodiment of the present invention.

A screen displayed on the display unit 25 is, for example, a project status display screen such as FIG. 19. The project status display screen is a screen to be viewed by the manager. The control unit 21 accepts the selection of a history display 171 by the manager via the input unit 24, thereby transmitting the viewing data display request signal to the server 1 (Step S138). The control unit 21 receives the viewing data from the server 1, and displays on the display unit 25 a table 172 that indicates the details of the projects and the like for which the recruitment contact data has been transmitted, and a checklist 173 of the staff to whom the recruitment contact data has been transmitted. In cases where the control unit 11 of the server 1 receives viewing data indicating that an intended-recruited operator has viewed the recruitment contact data on the display unit 45 of the operator terminal 4, an asterisk is displayed in a "confirmed" column 174 in the checklist 173. Thus, the viewing data is data indicating whether or not the intended-recruited operators have viewed the recruitment contact data. In the display example of FIG. 19, asterisks are displayed for the first and third intended-recruited operators so that the manager understands that those intended-recruited operators have viewed the recruitment contact data.

It should be noted that, for example, the viewing data is shown as a table such as FIG. 20. The viewing data table of FIG. 19 provides at least names and IDs of the intended-recruited operators for whom the recruitment contact data has been transmitted, as well as information indicating whether or not the recruitment contact data has been viewed (a "confirmed" column 210), and "0" is usually displayed in the "confirmed" column 210. If the control unit 11 of the server 1 has received the viewing data, "1" is displayed in the column, thereby indicating that the intended-recruited operator has received the recruitment contact data. The "1" or "0" corresponds to the presence or absence of asterisk in the "confirmed" column 174 in the project status display screen, respectively.

In Step S143, it is determined whether or not the application data acceptance termination instruction signal has been received from the manager terminal 2 (Step S142). If it has not been received, the process returns to Step S133 or Step S135, and the acceptance of reception is continued. Moreover, if the application data acceptance termination instruction signal has been received, this subroutine is completed.

Figure 21:
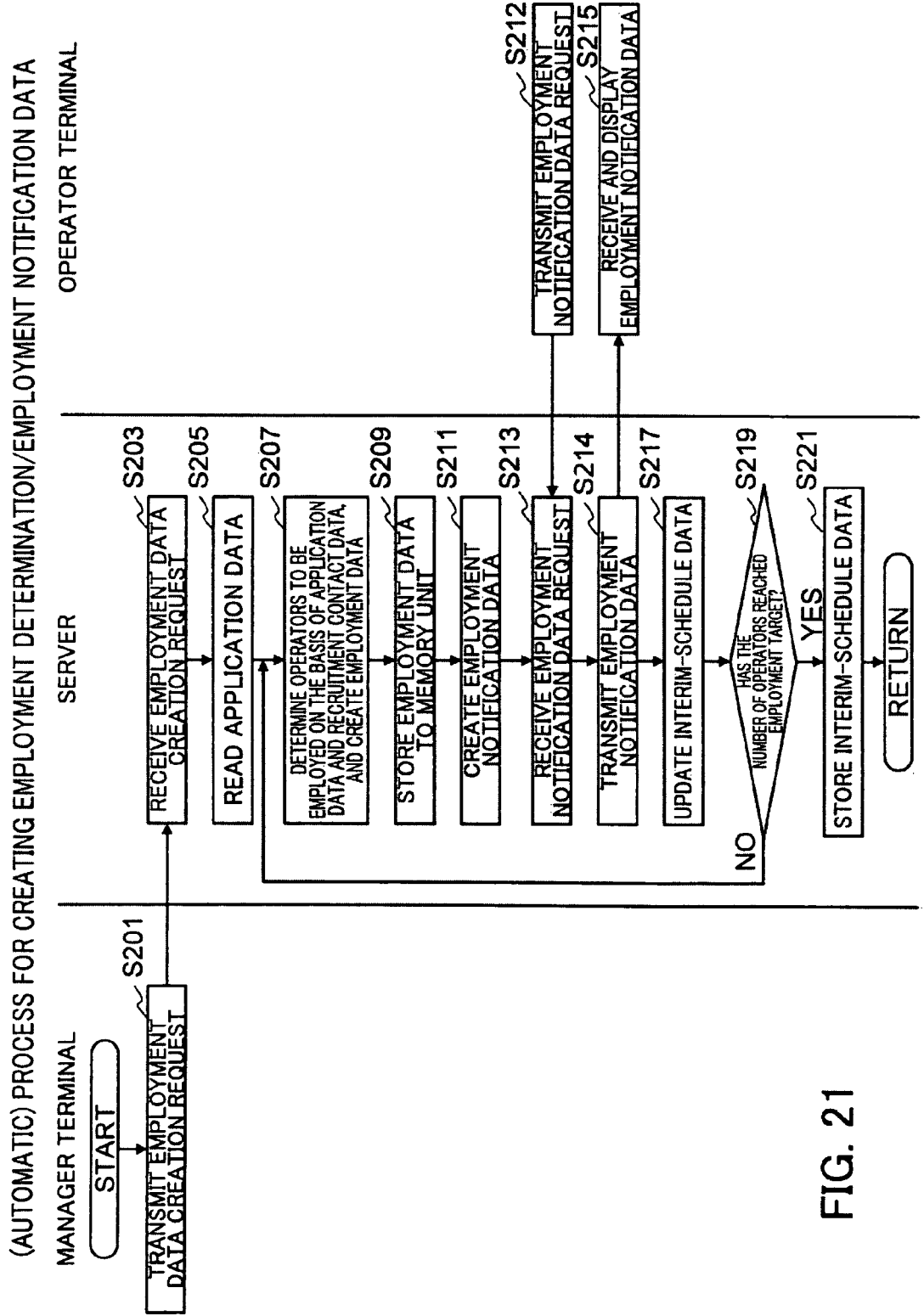
FIG. 21 is a flowchart illustrating a flow of a (automatic) process for creating employment determination/employment notification data according to an example of the preferred embodiment of the present invention.

FIG. 21 is a flowchart of a subroutine of an automatic process for creating employment determination/employment notification data according to an example of the preferred embodiment of the present invention. Hereinafter, the process for creating the employment-determination/employment-notification data is explained referring to FIGS. 21 to 22.

At first, the control unit 21 of the manager terminal 2 transmits an employment data creation process request signal to the server 1 via the communications unit 22 (Step S201). If the server 1 receives the transmitted employment data creation process request signal transmitted from the manager terminal 2 (Step S203), the server 1 reads the recruitment contact data and the application data from the schedule data memory unit 15 (Step S205).

In Step S207, operators to be employed are determined on the basis of the recruitment contact data, and employment data is created. More specifically, for example, the operators to be employed may be determined in the order that the application data had been received. Alternatively, priority regarding the employment of operators may be defined beforehand, and the employment may be automatically determined in the order of the priority.

It should be noted that the employment data is, for example, a table such as FIG. 22. The employment data in the table of FIG. 22 includes items such as ID, name, application date, skills, evaluation, and employment type. For example, the table indicates that the intended-recruited operator of ID1234 has the name "Hanako," applied on Aug. 5, 2005, has server skills and English skills, and is a regular employee with an evaluation of A. It should be noted that this employment data table may include items other than the present embodiment, or may include items fewer than the items of the present embodiment. For example, the table may include items such as contact address, requested priority, and absence rate of the intended-recruited operators. In a case where this process is completed, the process advances to Step S209.

In Step S209, the control unit 11 stores the employment data created in Step S207 to the schedule data memory unit 15 of the memory unit 13. In a case where this process is completed, the process advances to Step S210.

In Step S211, the control unit 11 creates employment notification data. More specifically, for example, the control unit 11 of the server 1 creates mail in a predetermined format for the intended-recruited operators. Upon receiving an employment notification data request transmission signal from the operator terminal 4 (Steps S212 and S213), the control unit 11 transmits the mail (Step S214). The mail may be transmitted to the operator terminal 4, or may be transmitted to portable units 6a and 6b of the intended-recruited operators from the mail server via the external communications network 5. The destination of the transmission can be set up at the operator terminal 4, and the results of the setup is transmitted to the server 1, and is stored in the statistical data memory unit 14. The control unit 41 of the operator terminal 4 receives the employment notification data via the communications unit 42 (Step S215).

In Step S217, the control unit 11 registers the data included in the employment data to the interim-schedule data, thereby updating the interim-schedule data. In a case where this process is completed, the process advances to Step S219.

In Step S219, the interim-schedule data updated in Step S217 is stored in the schedule data memory unit 15. In a case where this process is completed, the process advances to Step S221.

In Step S221, it is determined whether or not the number of employed operators is the same as the number of staff vacancies. If the number of employed operators is the same as the number of staff vacancies, the number of staff vacancies is currently zero. In a case where the number of employed operators is smaller than the number of staff vacancies, the number of intended-recruited operators is still insufficient. In this case, the recruitment is carried out again, or whether to adjust the schedule is examined.

Figure 23:
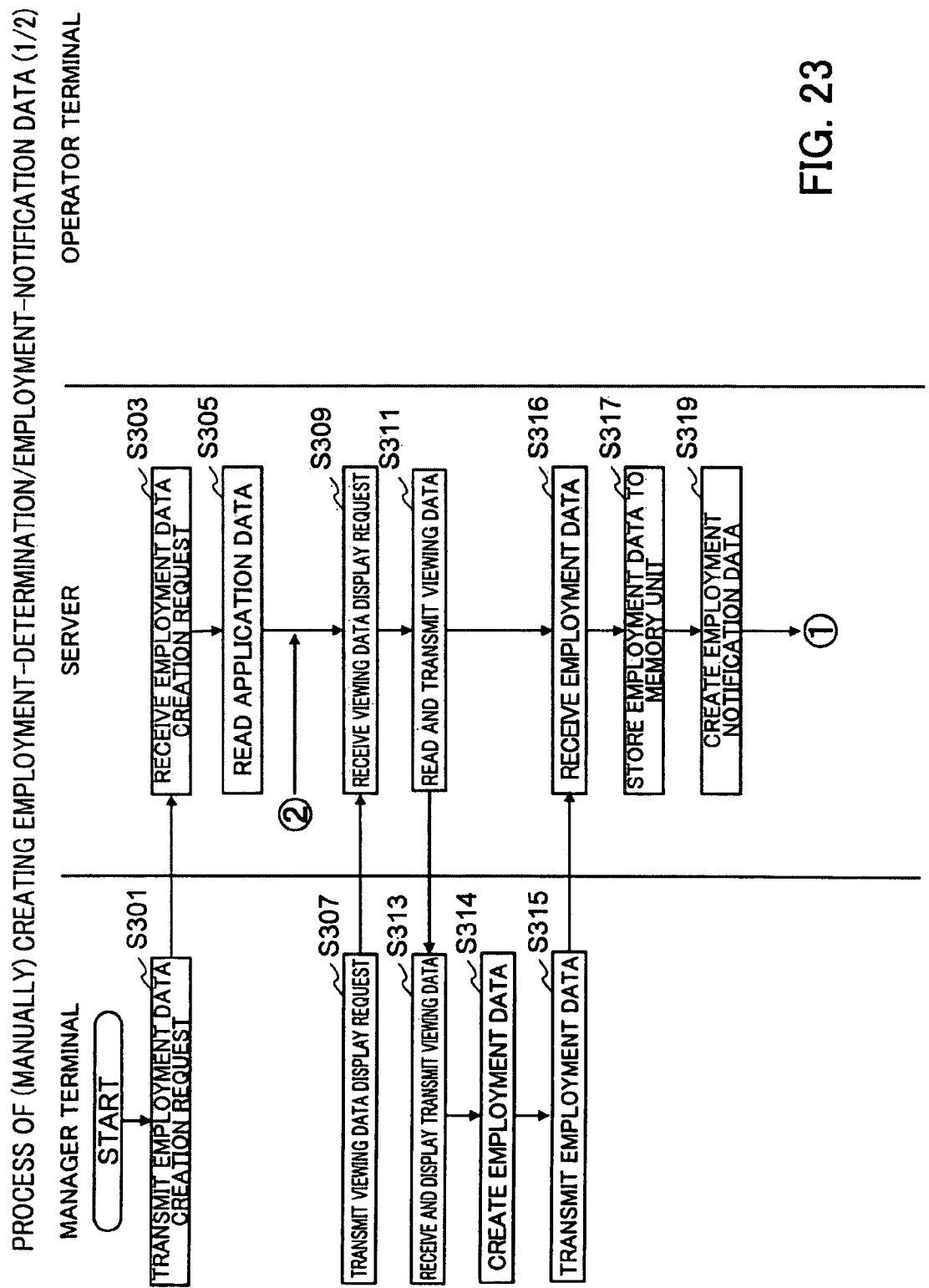
FIG. 23 is a flowchart illustrating a flow of a (manual) process for creating employment determination/employment notification data according to an example of the preferred embodiment of the present invention.

FIG. 21 is a flow of the process of automatically creating the employment-determination/employment-notification data; however, the process may also be performed manually. FIGS. 23 and 24 are flows of the process of manually creating the employment-determination/employment-notification data. Hereinafter, a description is made based on the drawings.

At first, the control unit 21 of the manager terminal 2 transmits an employment data creation process request signal to the server 1 via the communications unit 22 (Step S301). If the server 1 receives the transmitted employment data creation process request signal transmitted from the manager terminal 2 (Step S303), the server 1 reads the recruitment contact data and the application data from the schedule data memory unit 15 (Step S305).

In Step S307, the control unit 21 of the manager terminal 2 transmits a viewing data display request signal to the server 1 via the communications unit 22. The control unit 11 of the server 1, which has received the viewing data display request signal via the communications unit 12 (Step S309), reads the viewing data and transmits the viewing data to the manager terminal 2 via the communications unit 12 (Step S311). The control unit 21 of the manager terminal 2, which has received the viewing data via the communications unit 22, displays the viewing data on the display unit 25. A display example is a screen such as FIG. 25. When the control unit 21 accepts the fact that the manager has input a check into a check box 121 via the input unit 24 regarding the intended-recruited operators whom the manager wants to employ, employment data is created (Step S314). The control unit 21 of the manager terminal 2 transmits the employment data to the server 1 via the communications unit 22 (Step S315). The control unit 11 of the server 1 receives the employment data via the communications unit 12 (Step S316), and stores the employment data in the memory unit 13. The subsequent process is similar to the process after Step S209 in FIG. 21.

In a case of recruiting staff again, the project status confirmation screen in FIG. 19 is referred to when considering the staff to be recruited this time, thereby making it possible to recruit staff who have not viewed the recruitment contact data yet with higher priority. Accordingly, it is possible to efficiently recruit the staff with a higher possibility to accept the job. Moreover, a screen such as FIG. 26 may refer to a list of the schedule creation status regarding the on-going task or the future task.

In creating the schedule regarding each task, the screen in FIG. 26 displays the number of excess or deficient staff on a daily basis, and the progress status of the schedule creation. For example, in the task of customer support, a progress status 242 is displayed in ten steps, and a specific progress status statement 243 is displayed below the progress status. In this case, the schedule has already been distributed. The numbers of staff 244 planned on a daily basis are displayed below the progress statement 243. In this case, nine staff members are planned on the 1st of August, eight staff members on the 2nd, and nine staff members on the 3rd. Moreover, an eight staff member deficiency is indicated for the 4th, and a two staff member deficiency for the 5th, and also that four staff members are planned on the 6th, and seven staff members are planned on the 7th. In this way, the positive numbers indicate the planned number of staff, and the negative numbers indicate a deficiency in the number of staff, thereby enabling confirmation across all of the tasks regarding the progress status of the schedule creation and the number of excess or deficient staff on a certain day.

Though the embodiment of the present invention has been explained above, the explanation only illustrates specific examples and does not particularly limit the present invention. Moreover, the effects that have been described in the embodiment of the present invention only represent the most preferred effects resulting from the present invention. The effects according to the present invention are not limited to the effects described in the embodiment of the present invention.

What is claimed:

1. A method for a computer connected to a communications network to manage a work schedule of a plurality of staff members, the method comprising steps of:
   generating, via the computer, an assumed-schedule data that represents an assumed schedule of the plurality of staff members;
   designating, via the computer, a predetermined time period of acceptance and initiating acceptance of a requested-schedule data that represents a requested-schedule of each staff member from a terminal connected to the communications network;
   receiving to store, via the computer, the requested-schedule data of each staff member from the terminal;
   generating to display, via the computer, a vacancy schedule data that represents a vacancy schedule of the plurality of staff members on the basis of the assumed-schedule data and the requested-schedule data after the designated predetermined time period of acceptance has passed;
   generating, via the computer, a recruitment contact data that represents candidate staff members for whom recruitment contacts are to be performed on the basis of the vacancy schedule data and a staff attribute data that represents attributes of the plurality of staff members;
   storing, via the computer, an application data in response to the application data having been received from the candidate staff members for whom the recruitment contacts have been performed via the communications network;
   storing, via the computer, a viewing confirmation data in response to the viewing confirmation data having been received from terminals, wherein the viewing confirmation data represents the terminals having accepted viewing by the candidate staff members for whom the recruitment contacts have been performed;
   displaying, via computer, an application/viewing status representing the stored application data and the stored viewing confirmation data in response to acceptance of a request made by a manager; and
   displaying, via the computer, a schedule creation status data that represents a schedule creation status in response to a request by the manger having been accepted, on the basis of the assumed-schedule data, the requested-schedule data, and an interim-schedule data that represents an interim-schedule of the plurality of staff members on the basis of the assumed-schedule data and the requested-schedule data.

2. The method according to claim 1, further comprising a step of enabling, via the computer, transmission of the recruitment contact data only to disclosed contact addresses of the staff members via the communications network.

3. The method according to claim 1, further comprising a step of storing application data for the computer to store application data in response to the application data having been received from the staff for whom the recruitment contact has been performed via the communications network.

4. The method according to claim 1, further comprising a step of generating, via the computer, an employment data that represents a staff member to be employed in response to the application data having been received from the candidate staff members for whom the recruitment contacts have been performed via the communications network.

5. A non-transitory storage medium encoded with a machine readable computer program code for producing a work schedule of a plurality of staff members via a computer, the storage medium comprising instructions for causing the computer to implement a method comprising;
   generating, via the computer, an assumed-schedule data that represents an assumed schedule of the plurality of staff members;
   designating, via the computer, a predetermined time period of acceptance and initiating to accept a requested-schedule data that represents a requested-schedule of each staff member from a terminal connected to the communications network;
   receiving to store, via the computer, the requested-schedule data of each staff member from the terminal;
   generating to display, via the computer, a vacancy schedule data that represents a vacancy schedule of the plurality of staff members on the basis of the assumed-schedule data and the requested-schedule data after the designated predetermined time period of acceptance has passed;
   generating, via the computer, a recruitment contact data that represents candidate staff members for whom recruitment contacts are to be performed on the basis of the vacancy schedule data and a staff attribute data that represents attributes of the plurality of staff members;
   storing, via the computer, an application data in response to the application data having been received from the candidate staff members for whom the recruitment contacts have been performed via the communications network;
   storing, via the computer, a viewing confirmation data in response to the viewing confirmation data having been received from terminals, wherein the viewing confirmation data represents the terminals having accepted viewing by the candidate staff members for whom the recruitment contacts have been performed;
   displaying, via computer, an application/viewing status representing the stored application data and the stored viewing confirmation data in response to acceptance of a request made by a manager; and causing the manager terminal to display a schedule creation status data comprising a status of schedule creation based on the assumed-schedule data, the desired-schedule data, and an interim-schedule data related to an interim-schedule of the plurality of staff members generated based on the assumed-schedule data and the desired-schedule data, in response to a request by the manger.

6. A method for producing a work schedule of a plurality of staff members in a system comprising a server, a manager terminal and user terminals that are communicably connected to each other via a communications network, the method comprising:

generating by the server an assumed-schedule data of the plurality of staff members;

notifying from the server to each user terminal a predetermined period of time during which each of the plurality of staff members is permitted to send a desired schedule data through each user terminal;

initiating by the server to accept the desired schedule data from each user terminal;

receiving by the server the desired schedule data from each user terminal and storing the desired schedule data in a memory of the server;

generating by the server a vacancy schedule data of the plurality of staff members based on the assumed-schedule data and the desired schedule data after the predetermined period of time expires;

transmitting by the server the vacancy schedule data to the manager terminal such that the vacancy schedule is displayed on the manager terminal;

generating by the server a recruitment contact data representative of candidate staff members for whom recruitment contacts are to be performed based on the vacancy schedule data and a staff attribute data representative of attributes of the plurality of staff members;

storing an application data in the memory of the server in response to receiving the application data from the candidate staff members for whom the recruitment contacts have been performed via the communications network;

storing a viewing confirmation data in the memory of the server in response to receiving the viewing confirmation data from user terminals of the candidate staff members for whom the recruitment contacts have been performed, the viewing confirmation data representing that the user terminals have accepted viewing performed by the candidate staff members;

causing by the server the stored application data and the stored viewing confirmation data to be displayed on the manager terminal in response to accepting a request by a manager; and causing the manager terminal to display a schedule creation status data comprising a status of schedule creation based on the assumed-schedule data, the desired-schedule data, and an interim-schedule data related to an interim-schedule of the plurality of staff members generated based on the assumed-schedule data and the desired-schedule data, in response to a request by the manger.

7. The method according to claim 6, further comprising:

causing the server to transmit the recruitment contact data only to disclosed contact addresses of the plurality of staff members via the communications network.

8. The method according to claim 6, further comprising:

generating by the server an employment data representative of a staff member to be employed in response to storing the application data of the candidate staff members for whom the recruitment contacts have been performed via the communications network.

* * * * *